US011195414B2

(12) United States Patent
Miyajima

(10) Patent No.: US 11,195,414 B2
(45) Date of Patent: Dec. 7, 2021

(54) INFORMATION PROCESSING DEVICE AND INFORMATION PROCESSING METHOD

(71) Applicant: SONY CORPORATION, Tokyo (JP)

(72) Inventor: Yasushi Miyajima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 64 days.

(21) Appl. No.: 16/617,850

(22) PCT Filed: Mar. 13, 2018

(86) PCT No.: PCT/JP2018/009730
§ 371 (c)(1),
(2) Date: Nov. 27, 2019

(87) PCT Pub. No.: WO2018/225320
PCT Pub. Date: Dec. 13, 2018

(65) Prior Publication Data
US 2020/0135026 A1    Apr. 30, 2020

(30) Foreign Application Priority Data

Jun. 9, 2017    (JP) .............................. JP2017-114519

(51) Int. Cl.
*G08G 1/00* (2006.01)
*G08G 1/123* (2006.01)
(Continued)

(52) U.S. Cl.
CPC ......... *G08G 1/123* (2013.01); *G01C 21/3438* (2013.01); *G06Q 10/02* (2013.01);
(Continued)

(58) Field of Classification Search
CPC ................................ G08G 1/00; G08Q 10/00
See application file for complete search history.

(56) References Cited

U.S. PATENT DOCUMENTS

2007/0143012 A1    6/2007   Keaveny et al.
2008/0288333 A1    11/2008  Keaveny et al.
(Continued)

FOREIGN PATENT DOCUMENTS

CA          2530909 A1    6/2007
CN          104620296 A   5/2015
(Continued)

OTHER PUBLICATIONS

International Search Report and Written Opinion of PCT Application No. PCT/JP2018/009730, dated Apr. 10, 2018, 06 pages of ISRWO.
Extended European Search Report of EP Application No. 18813139.5, dated Feb. 6, 2020, 08 pages.

*Primary Examiner* — Shirley Lu
(74) *Attorney, Agent, or Firm* — Chip Law Group

(57) ABSTRACT

An object of the present invention is to provide an information processing device and an information processing method, each of which is capable of setting a spot position of service provision so as to further improve convenience for users. An information processing device including: a communication unit that receives a position request from a user, the position request requesting a position of a spot at which a specific service is provided; and a control unit that dynamically sets a position of the spot by analyzing position requests from a plurality of users received through the communication unit.

12 Claims, 33 Drawing Sheets

(51) Int. Cl.
*H04W 4/029* (2018.01)
*G01C 21/34* (2006.01)
*G06Q 10/02* (2012.01)
*G06Q 10/04* (2012.01)
*G06Q 50/30* (2012.01)
*H04W 4/021* (2018.01)
*H04W 4/02* (2018.01)

(52) U.S. Cl.
CPC ............ *G06Q 10/047* (2013.01); *G06Q 50/30* (2013.01); *H04W 4/022* (2013.01); *H04W 4/023* (2013.01); *H04W 4/029* (2018.02)

(56) References Cited

U.S. PATENT DOCUMENTS

| | | |
|---|---|---|
| 2015/0228192 A1 | 8/2015 | Kawamoto et al. |
| 2016/0021154 A1* | 1/2016 | Schoeffler ............. H04L 51/046 709/204 |
| 2018/0143027 A1* | 5/2018 | Schlesinger ........... G06Q 50/30 |

FOREIGN PATENT DOCUMENTS

| | | |
|---|---|---|
| EP | 2899710 A1 | 7/2015 |
| JP | 2001-209894 A | 8/2001 |
| JP | 2002-288790 A | 10/2002 |
| JP | 2002-334398 A | 11/2002 |
| JP | 2002-342873 A | 11/2002 |
| JP | 2004-227262 A | 8/2004 |
| JP | 2013-186541 A | 9/2013 |
| JP | 2013186541 A * | 9/2013 |
| JP | 5967205 B2 | 8/2016 |
| WO | 2014/045359 A1 | 3/2014 |

* cited by examiner

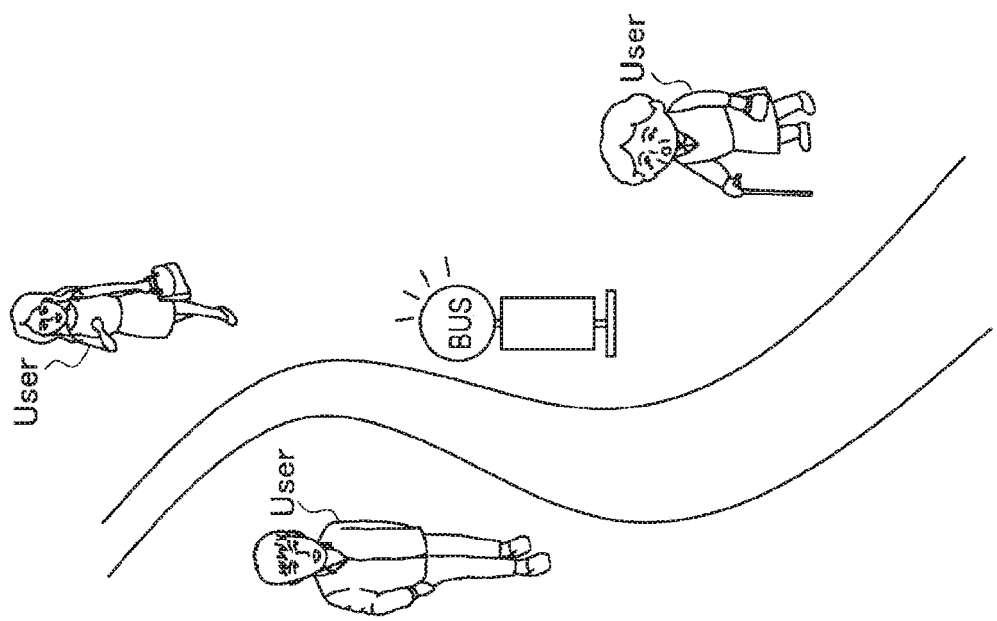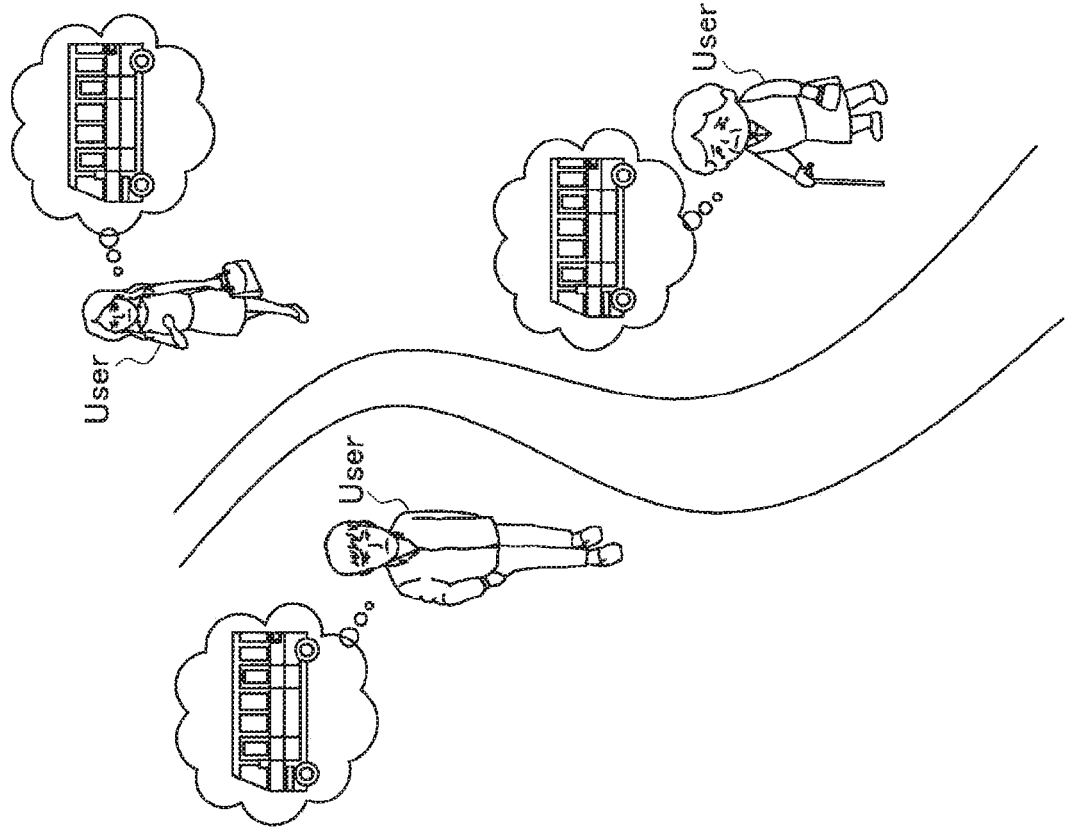
FIG. 1

FIG. 7

LINE INFORMATION

| LINE ID | LINE NAME | STOP A | STOP B | ROUTE INFORMATION |
|---|---|---|---|---|
| 1 | ○○○ AND □□ STATION WEST EXIT | ○○○ | □□ STATION WEST EXIT | REFERENCE ROUTE INFORMATION OF REFERENCE ROUTE CONNECTING BETWEEN STOP A AND STOP B |
| 2 | PUBLIC HALL TO △△ STATION VIA □○ | △△ STATION | PUBLIC HALL | REFERENCE ROUTE INFORMATION OF REFERENCE ROUTE CONNECTING BETWEEN STOP A AND STOP B |
| ... | ... | ... | ... | ... |

TRAVELING INFORMATION

| TRAVELING ID | DIRECTION | DEPARTURE TIME |
|---|---|---|
| ... | ... | ... |
| 1123 | UP | 2017/2/11 19:48 |
| 1124 | DOWN | 2017/2/11 20:11 |
| 1125 | UP | 2017/2/12 8:13 |
| 1126 | DOWN | 2017/2/12 8:43 |
| 1127 | UP | 2017/2/12 9:15 |
| ... | ... | ... |

FIG. 8

| USER ID | LINE ID | TRAVELING ID | REQUEST TIME (LATEST) | LATEST REQUEST POSITION (LATITUDE/LONGITUDE) |
|---|---|---|---|---|
| 1 | 2 | 987 | 2017/2/11 14:02 | 35.460911, 139.6314673 |
| 2 | 1 | 1127 | 2017/2/10 13:47 | 35.467875, 139.6272566 |
| 3 | 3 | 3418 | 2017/2/11 13:58 | 35.456948, 139.6303495 |
| 4 | 1 | 1127 | 2017/2/11 8:42 | 35.467342, 139.6272883 |
| 5 | 2 | 987 | 2017/2/11 16:12 | 35.460984, 139.6314243 |
| ... | ... | ... | ... | ... |

| SPOT ID | LATITUDE/LONGITUDE | POSITION REQUEST USER ID |
|---|---|---|
| 1 | 35.4608536, 139.6401091 | 2, 4 |
| 2 | 35.4690201, 139.6271758 | 1, 5, 7 |
| 3 | 35.4578413, 139.6322956 | 3, 6, 11, 12 |
| ... | ... | ... |

FIG. 13
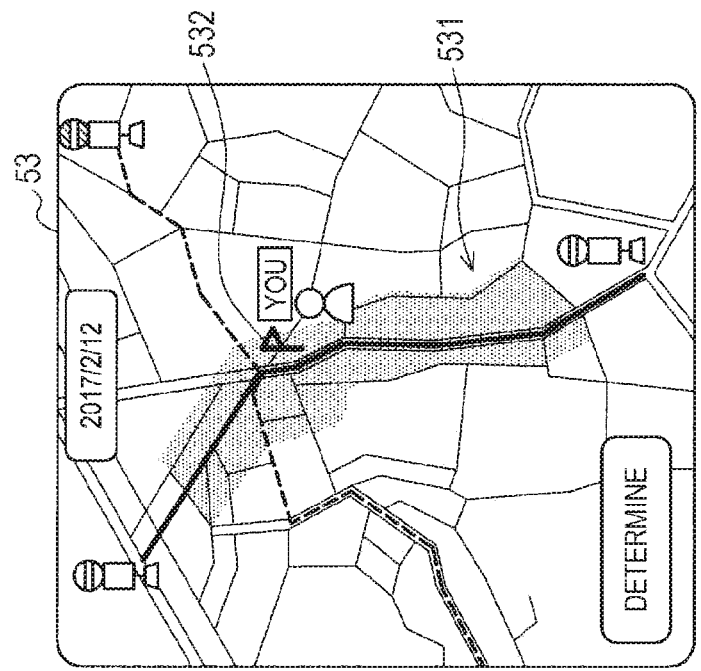
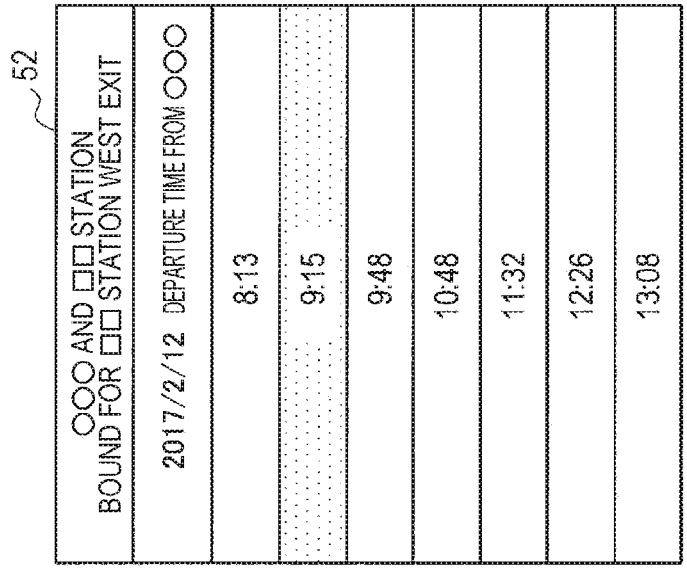
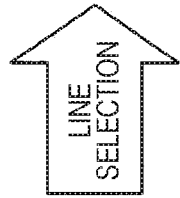

FIG. 20

| USER ID | SPOT ID | POSITION REQUEST TIME (LATEST) | LATEST REQUEST POSITION (LATITUDE/LONGITUDE) |
|---|---|---|---|
| 1 | 2 | 2017/2/10 14:02 | 35.460911, 139.6314673 |
| 2 | 1 | 2017/2/10 13:47 | 35.467875, 139.6272566 |
| 2 | 3 | 2017/2/15 0:38 | 35.624433, 139.6598707 |
| 3 | 3 | 2017/2/10 13:58 | 35.456948, 139.6303495 |
| ... | ... | ... | ... |

FIG. 21

| CONTENT ID | KIND | SPOT ID |
|---|---|---|
| 1 | ○○ MONSTER | 2 |
| 2 | TEA △△△ | 1, 3 |
| ... | ... | ... |

FIG. 22

| SPOT ID | LATITUDE/LONGITUDE | POSITION REQUEST USER ID | CONTENT ID | OFFICIAL SPOT |
|---|---|---|---|---|
| 1 | 35.4608536, 139.6401091 | 2, 4 | 2 | No |
| 2 | 35.4690201, 139.6271758 | 1, 4, 7 | 1 | No |
| 3 | 35.4578413, 139.6322956 | 2, 3, 6, 11, 12 | 2 | No |
| 4 | 35.4700315, 139.6021262 | — | 5 | Yes |
| ... | ... | ... | ... | ... |

FIG. 29

| USER ID | POSITION REQUEST TIME (LATEST) | LATEST REQUEST POSITION (LATITUDE/LONGITUDE) |
|---|---|---|
| 1 | 2017/2/10 14:02 | 35.460911, 139.6314673 |
| 2 | 2017/2/10 13:47 | 35.467875, 139.6272566 |
| 3 | 2017/2/10 13:58 | 35.456948, 139.6303495 |
| ... | ... | ... |

FIG. 30

| AUTOMATIC SELLING DEVICE ID | CURRENT POSITION (LATITUDE/ LONGITUDE) | SOLD OUT | NUMBER OF STOP SPOTS |
|---|---|---|---|
| 1 | 35.4587656, 139.6255205 | No | 13 |
| 2 | 35.4756523, 139.6306862 | Yes | 8 |
| ... | ... | ... | ... |

FIG. 31

| SPOT ID | LATITUDE/LONGITUDE | POSITION REQUEST USER ID | AUTOMATIC SELLING DEVICE ID | ESTIMATED ARRIVAL TIME |
|---|---|---|---|---|
| 1 | 35.4608536, 139.6401091 | 2, 4 | 2 | 14:05 |
| 2 | 35.4690201, 139.6271758 | 1, 5, 7 | 1 | 14:34 |
| 3 | 35.4578413, 139.6322956 | 3, 6, 11, 12 | 2 | 14:09 |
| ... | ... | ... | ... | ... |

FIG. 35

| USER ID | PHYSICAL WEIGHTING (Wp) | WEIGHTING HAVING SENSITIVITY VALUE (Wk) | POSITION REQUEST TIME (LATEST) | LATEST REQUEST POSITION (LATITUDE/LONGITUDE) |
|---|---|---|---|---|
| 1 | 1.0 | 0.7 | 2017/2/10 14:02 | 35.460911, 139.6314673 |
| 2 | 0.8 | 1.3 | 2017/2/10 13:47 | 35.467875, 139.6272566 |
| 3 | 1.5 | 1.2 | 2017/2/10 13:58 | 35.456948, 139.6303495 |
| ... | ... | ... | ... | ... |

SPOT POSITION CALCULATION IMAGE
THAT USES DYNAMIC MODEL

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/009730 filed on Mar. 13, 2018, which claims priority benefit of Japanese Patent Application No. JP 2017-114519 filed in the Japan Patent Office on Jun. 9, 2017. Each of the above-referenced applications is hereby incorporated herein by reference in its entirety.

TECHNICAL FIELD

The present disclosure relates to an information processing device and an information processing method.

BACKGROUND ART

Conventionally, with respect to a service that is associated with a position, a position at which a service is received is fixed, or in the case of service provision by a moving object, waiting for a service at a predetermined place is required.

For example, in the case of a bus, a route is predetermined, and the bus is caused to travel so as to visit a predetermined bus stop at the predetermined time.

Here, with respect to a bus traveling technology, for example, the undermentioned patent document 1 discloses a passenger vehicle operation system that is capable of changing a rounding route according to a request from a user.

In addition, the undermentioned patent document 2 discloses a quick-response type vehicle getting-on-and-off system in which a getting-on-and-off request of a user in a demand route other than a main route that is a predetermined route is accepted, a user who gets off a vehicle is caused to get off early basically in the order in which getting-on-and-off requests are accepted, without changing an ordinary vehicle traveling plan as a general rule, and a demand driving plan is determined on the condition that the getting-on time of a user is shortened.

Moreover, the undermentioned patent document 3 discloses a route bus traveling system in which a user can get on a desired route bus at an arbitrary waiting place other than stops along a traveling route of the route bus.

Further, the undermentioned patent document 4 discloses a riding reservation method in which a riding reservation from a user is accepted in vehicle management having a traveling schedule of stopping at a predetermined point along a predetermined traveling route at the predetermined time, and getting on and off is enabled at an arbitrary point along the traveling route.

CITATION LIST

Patent Document

Patent Document 1: Japanese Patent Application Laid-Open No. 2001-209894
Patent Document 2: Japanese Patent Application Laid-Open No. 2004-227262
Patent Document 3: Japanese Patent Application Laid-Open No. 2002-334398
Patent Document 4: Japanese Patent Application Laid-Open No. 2002-288790

SUMMARY OF THE INVENTION

Problems to be Solved by the Invention

However, in each of the technologies described in the patent documents 1 to 4, although a getting-on-and-off place is determined according to a position that has been individually requested by a user, determination of the most suitable getting-on-and-off place performed in a case where requests have been made from a plurality of users is not taken into consideration. Therefore, there arises a problem that in a case where requests have been made from a plurality of users, if a position designated by each user is treated as a getting-on-and-off place, a traveling efficiency decreases.

In addition, in the prior art, although a user is allowed to designate an arbitrary place as a getting-on-and-off place, the designated place is always along a preset traveling route, or along a demand route to be added to the preset main route, which forces the user to move at least to the traveling route, and therefore it cannot be said that the designated place is the most suitable getting-on-and-off position.

Accordingly, the present disclosure proposes an information processing device and an information processing method, each of which is capable of setting a spot position of service provision so as to further improve convenience for users.

Solutions to Problems

According to the present disclosure, there is proposed an information processing device including: a communication unit that receives a position request from a user, the position request requesting a position of a spot at which a specific service is provided; and a control unit that dynamically sets a position of the spot by analyzing position requests from a plurality of users received through the communication unit.

According to the present disclosure, there is proposed an information processing method executed by a processor, the method including the steps of: receiving a position request from a user by a communication unit, the position request requesting a position of a spot at which a specific service is provided; and dynamically setting a position of the spot by analyzing position requests from a plurality of users received through the communication unit.

Effects of the Invention

As described above, according to the present disclosure, a spot position of service provision can be set so as to further improve convenience for users.

It should be noted that the above effects are not necessarily limitative, and along with or instead of the above effects, any effect described in the present description, or other effects that can be grasped from the present description, may be exhibited.

BRIEF DESCRIPTION OF DRAWINGS

FIG. 1 is a drawing illustrating an outline of an information processing system according to one embodiment of the present disclosure.

FIG. 7 is a drawing illustrating an example of a data configuration of bus information stored in a bus information DB according to the first example of the present embodiment.

FIG. 8 is a drawing illustrating an example of request information of each user stored in a user information DB according to the first example of the present embodiment.

FIG. 13 is a transition diagram illustrating an example of a request input screen displayed on the user terminal according to the first example of the present embodiment.

FIG. 20 is a drawing illustrating an example of position request information saved in a user information DB according to the second example of the present embodiment.

FIG. 21 is a drawing illustrating an example of content information saved in a content information DB according to the second example of the present embodiment.

FIG. 22 is a drawing illustrating an example of spot information saved in a spot information DB according to the second example of the present embodiment.

FIG. 29 is a drawing illustrating an example of position request information saved in a user information DB according to the third example of the present embodiment.

FIG. 30 is a drawing illustrating an example of mobile automatic selling device information stored in a selling device information DB according to the third example of the present embodiment.

FIG. 31 is a drawing illustrating an example of spot information stored in a spot information DB according to the third example of the present embodiment.

FIG. 35 is a drawing illustrating an example of user information stored in a user information DB 223 according to a fourth example of the present embodiment.

MODE FOR CARRYING OUT THE INVENTION

Figure 2:
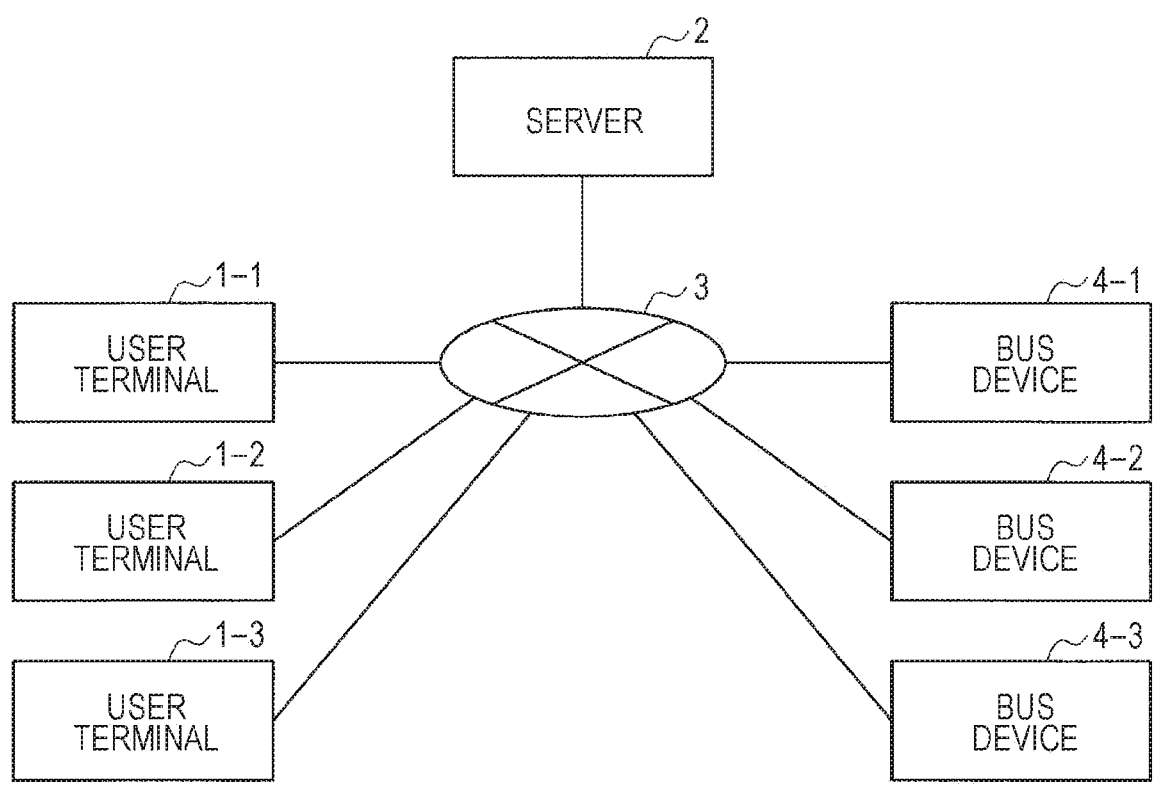
FIG. 2 is a diagram illustrating an example of an overall configuration of the information processing system according to the present embodiment.

Preferred embodiments of the present disclosure will be detailed below with reference to the accompanying drawings. It should be noted that components, described herein and on the drawings, having substantially the same functional configurations are provided with the same reference numbers, and explanation thereof will not be repeated.

In addition, explanations are made in the following order.
1. Outline of an information processing system according to one embodiment of the present disclosure
2. First example
   2-1. Configuration of user terminal 1
   2-2. Configuration of server 2A
   2-3. Configuration of bus device 4A
   2-4. Operation processing
      (2-4-1. Acceptance processing of accepting a spot position request on the server side)
      (2-4-2. Processing on the terminal side)
      (2-4-3. Spot generation processing on the server side)
3. Second example
   3-1. Configuration of server 2B
   3-2. Operation processing
      (3-2-1. Acceptance processing of accepting a spot position request on the server side)
      (3-2-2. Processing on the terminal side)
      (3-2-3. Spot generation processing on the server side)

4. Third example
4-1. Configuration of server 2C
4-2. Configuration of mobile automatic selling device 4B
4-3. Operation processing
 (4-2-1. Acceptance processing of accepting a spot position request on the server side)
 (4-2-2. Processing on the terminal side)
 (4-2-3. Spot generation processing on the server side)
5. Fourth example
6. Summary

1. Outline of an Information Processing System According to One Embodiment of the Present Disclosure FIG. 1 is a drawing illustrating an outline of an information processing system according to one embodiment of the present disclosure. As shown in FIG. 1, in the present embodiment, a position of a service provision spot is set at the most suitable position on the basis of requests from a plurality of users, which enables to further enhance convenience for the users.

Specifically, as shown in, for example, FIG. 1, a bus stop is set (newly generated) on the basis of bus getting-on requests from a plurality of users. The getting-on requests include getting-on positions desired by the respective users, and the information processing system according to the present embodiment sets, as a stop, a midway point or the like of the respective getting-on positions desired by the plurality of users.

In the prior art described above, it is assumed that stop positions of a bus are determined from position requests by respective individuals just as they are. Therefore, there arises a problem that in a case where requests are made from a plurality of users within a certain close range, the bus stops all of requested positions, resulting in low efficiency. Meanwhile, in the information processing system according to the present embodiment, a position of a service provision spot is set at the most suitable position, for example, at a midway point or the like of respective getting-on positions desired by a plurality of users, on the basis of requests from the plurality of users. Therefore, a service provision spot that is the most suitable overall for a large number of users who use a service can be set.

In addition, the information processing system according to the present embodiment is not limited to setting of a bus stop on a preset predetermined traveling route. A stop can also be set, for example, within a predetermined range from a reference route. This enables to set a further suitable spot position according to spot provision position requests from a plurality of users.

In addition, in a case where a bus stop is set as a spot position, the information processing system according to the present embodiment accepts, for example, position requests of a plurality of users on a traveling basis during a predetermined time period before bus traveling, so as to set spot provision positions, and determines, as appropriate, a route for going around the plurality of set spot positions.

It is assumed that users of a bus differ depending on the day of the week or a time zone. Thus, there is a possibility that the most suitable position of the bus stop or the most suitable route will also differ depending on the day of the week or a time zone. Therefore, according to the present embodiment, the most suitable stop or the most suitable route can be dynamically determined on a traveling basis.

In addition, in a case where an appearance place of content such as a character and an item is set as a spot position, the information processing system according to the present embodiment may always accept position requests from a plurality of users to update the appearance place of the content as appropriate.

Moreover, in a case where a service provision place such as a mobile automatic selling device is set as a spot position, the information processing system according to the present embodiment may accept position requests from a plurality of users in real time within operating hours so as to set a provision place as appropriate.

Subsequently, an overall configuration of such an information processing system according to the present embodiment will be described with reference to FIG. 2. FIG. 2 is a diagram illustrating an example of an overall configuration of the information processing system according to the present embodiment.

As shown in FIG. 2, the information processing system according to the present embodiment includes a user terminal 1, and a server 2. The user terminal 1 and the server 2 are connected to each other through a network 3, and therefore data can be transmitted/received therebetween.

The user terminal 1 transmits a request for service provision to the server 2 according to operation input by a user. The request for service provision includes a request (position request) for a spot position of service provision.

In addition, the user terminal 1 according to the present embodiment is realized by, for example, a smart phone, a mobile phone terminal, a tablet terminal, a personal computer (PC), a wearable device (for example, a Head Mounted Display (HMD), a smart eyeglass, a smart watch, a smart band, a smart neck speaker, a smart earring, etc.), a music player, a game machine, or the like.

The server 2 sets a spot position of service provision on the basis of position requests from a plurality of users, and performs the control in such a manner that the user terminal 1 is notified of the set spot position, and a predetermined service is provided at the set spot position. For example, in a case where service provision is performed by a moving object 4 such as a bus, the server 2 transmits information of the set spot position to the moving object 4, and instructs the moving object 4 to provide a service at a predetermined spot position.

It should be noted that although FIG. 2 illustrates, as an example, three user terminals 1-1 to 1-3 and three moving objects 4-1 to 4-3, the present embodiment is not limited to this example. The information processing system according to the present embodiment can include one or more user terminals 1 and one or more moving objects 4.

The information processing system according to one embodiment of the present disclosure has been described above. Subsequently, the information processing system according to the present embodiment will be specifically described by using a plurality of examples.

2. First Example

In the first example, a case where the information processing system according to the present embodiment is applied to setting of a route bus stop will be described.

An information processing system according to the first example includes the user terminal 1, a server 2A, and a bus device 4A. The user terminal 1 and the server 2A are connected to each other through the network 3, and therefore data can be transmitted/received therebetween. In addition, the server 2A is capable of transmitting information or the like of the set stop (spot position) to the bus device 4A through the network 3.

Each configuration included in the present example will be successively described below.

<2-1. Configuration of User Terminal 1>

Figure 3:
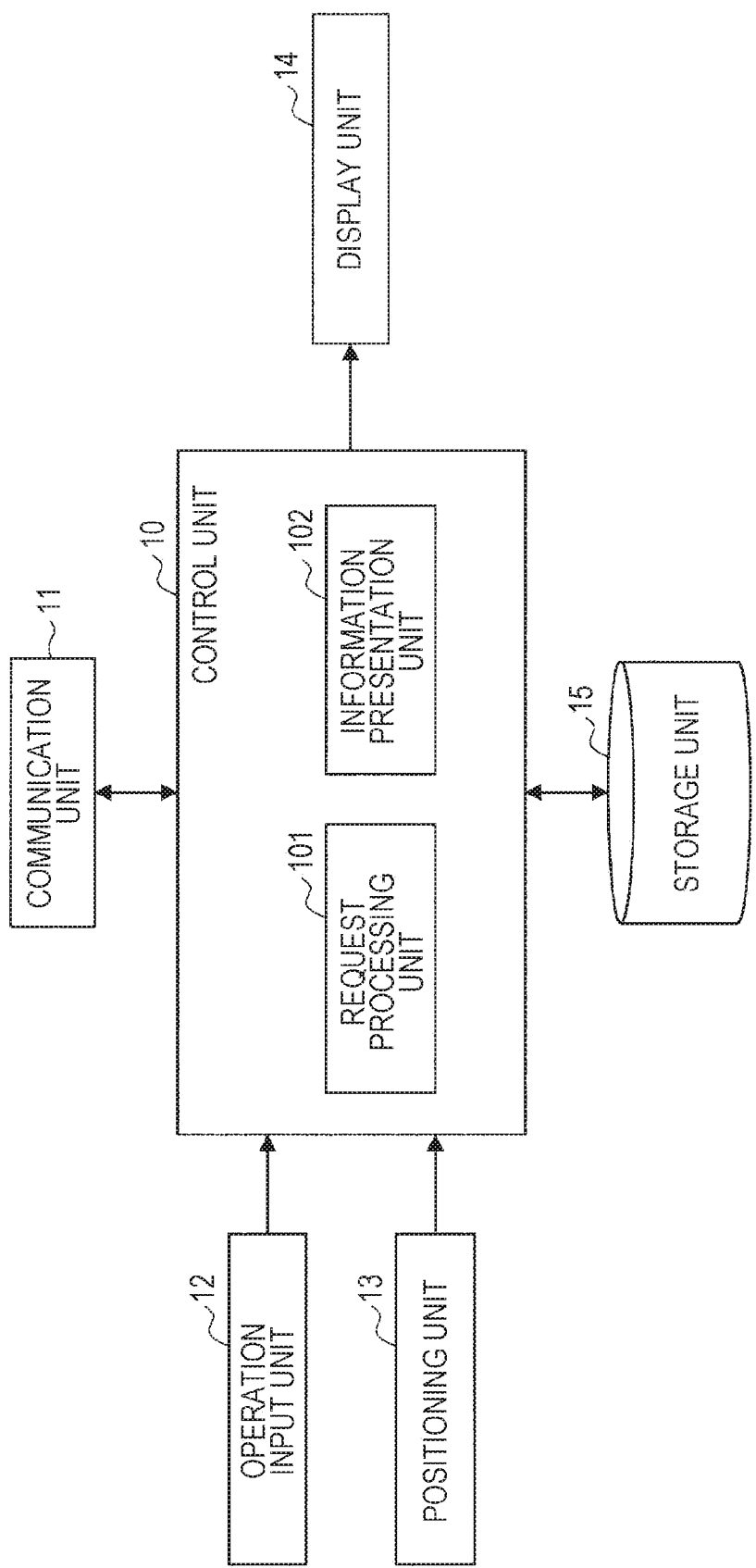
FIG. 3 is a block diagram illustrating an example of a configuration of a user terminal according to a first example of the present embodiment.

FIG. 3 is a block diagram illustrating an example of a configuration of the user terminal 1 according to the present example. As shown in FIG. 3, the user terminal 1 includes a control unit 10, a communication unit 11, an operation input unit 12, a positioning unit 13, a display unit 14, and a storage unit 15.

(Control Unit 10)

The control unit 10 functions as a computation processing device and a control device, and controls overall operation in the user terminal 1 according to various kinds of programs. The control unit 10 is realized by, for example, an electronic circuit such as a Central Processing Unit (CPU), and a microprocessor. In addition, the control unit 10 may include a Read Only Memory (ROM) for storing a program, a computation parameter and the like that are used, and a Random Access Memory (RAM) for temporarily storing a parameter and the like that change as appropriate.

Moreover, the control unit 10 according to the present embodiment also functions as a request processing unit 101 and an information presentation unit 102.

The request processing unit 101 performs the control in such a manner that a position request for a service provision spot is accepted from a user, and request information is transmitted from the communication unit 11 to the server 2A. More specifically, for example, the request processing unit 101 transmits a request that have been input by the user, the request relating to getting on and off a route bus (an area in which getting on and off is desired, a desired place, the desired date and time (the rough date and time suffices) or the like), to the server 2A as request information.

The information presentation unit 102 performs the control in such a manner that the information received from the server 2A by the communication unit 11 is presented to the user. For example, the information presentation unit 102 displays, on the display unit 14, spot position information that has been set by the server 2A according to the position request from the user, so as to present the spot position information to the user.

(Communication Unit 11)

The communication unit 11 is wiredly or wirelessly connected to the network 3, and transmits/receives data to/from the server 2A on the network. The communication unit 11 is communicably connected to the network 3 by using, for example, a wired/wireless Local Area Network (LAN), or Wi-Fi (registered trademark), Bluetooth (registered trademark), a mobile phone communication network (Long Term Evolution (LTE), 3G (the third generation mobile communication method)) or the like.

(Operation Input Unit 12)

The operation input unit 12 accepts an operation instruction by the user, and outputs operation content to the control unit 10. The operation input unit 12 may be, for example, a touch sensor, a pressure sensor, or a proximity sensor. Alternatively, the operation input unit 12 may be a physical configuration such as a button, a switch, and a lever.

(Positioning Unit 13)

The positioning unit 13 has a function of detecting a current position of the user terminal 1 on the basis of a signal obtained from the outside. Specifically, for example, the positioning unit 13 is realized by a Global Positioning System (GPS) positioning unit. The positioning unit 13 receives an electrical wave from a GPS satellite to detect a position at which the user terminal 1 exists, and outputs detected position information to the control unit 10. In addition, other than GPS, the positioning unit 13 may be a unit that detects a position by using, for example, Wi-Fi (registered trademark), Bluetooth (registered trademark), by transmission and reception to/from a portable telephone, a PHS, a smart phone or the like, or by short-distance communication or the like.

(Display Unit 14)

The display unit 14 is a display device that outputs, for example, an input screen of a spot position request, a presentation screen of spot position information that has been set, and the like. This display unit 14 may be, for example, a display device such as a liquid crystal display (Liquid Crystal Display (LCD)), and an organic Electro Luminescence (EL) display.

(Storage Unit 15)

The storage unit 15 is realized by a Read Only Memory (ROM) for storing a program, a computation parameter and the like that are used for processing of the control unit 10, and by a Random Access Memory (RAM) for temporarily storing a parameter and the like that change as appropriate.

The configuration of the user terminal 1 according to the present embodiment has been specifically described above.

It should be noted that the configuration of the user terminal 1 is not limited to the example shown in FIG. 3. For example, as an input means, the configuration is not limited to the operation input unit 12, and may include a voice input unit (microphone), a camera, and various sensors (a motion sensor, a living-body sensor, etc.). As an output unit, the configuration is not limited to the display unit 14, and may be provided with an audio output unit (speaker).

<2-2. Configuration of Server 2A>

Subsequently, a configuration of the server 2A included in the information processing system according to the present example will be described with reference to FIG. 4.

Figure 4:
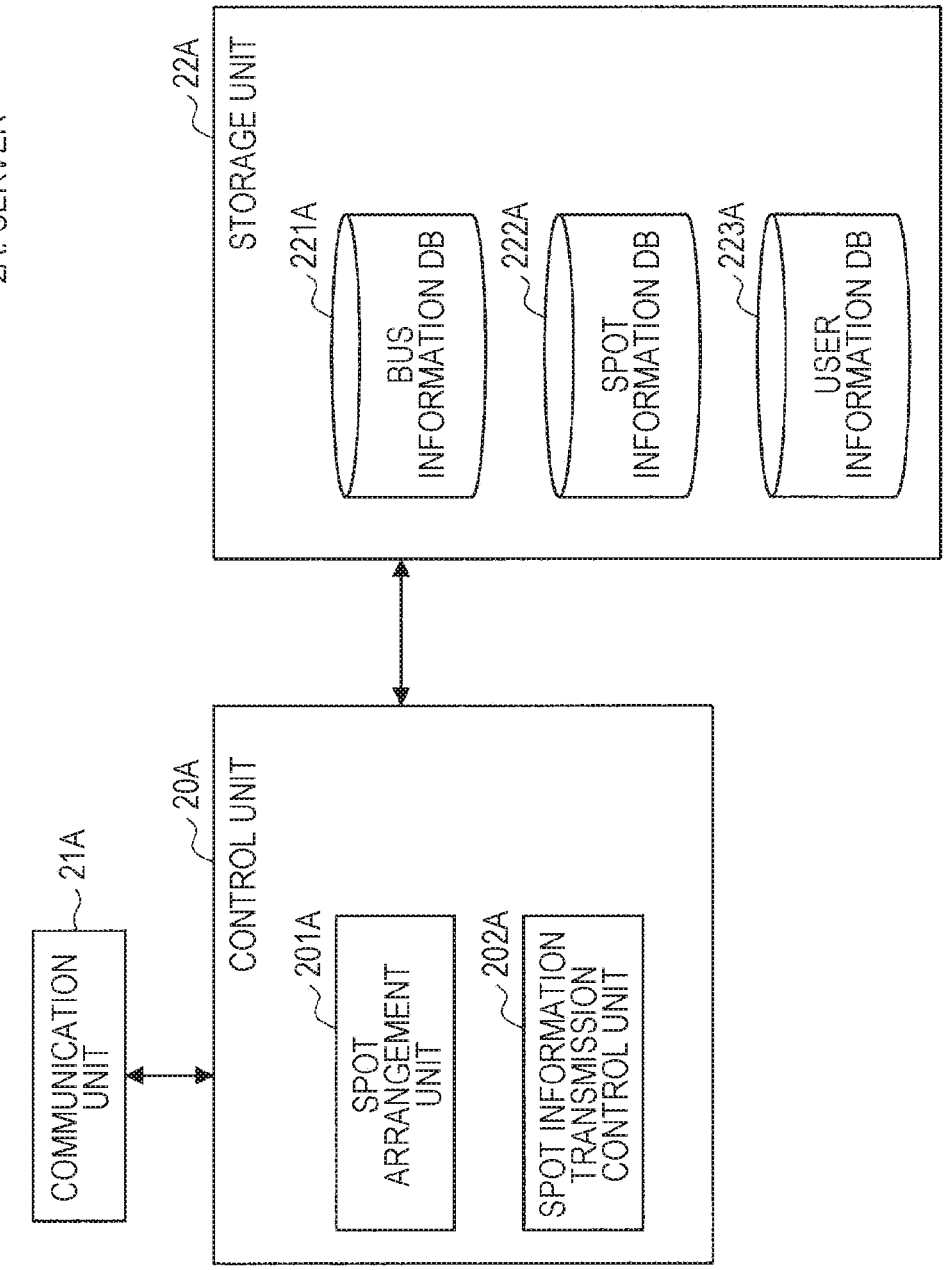
FIG. 4 is a block diagram illustrating an example of a configuration of a server according to the first example of the present embodiment.

FIG. 4 is a block diagram illustrating an example of a configuration of the server 2A according to the present example. As shown in FIG. 4, the server 2A according to the present example includes a control unit 20A, a communication unit 21A, and a storage unit 22A.

(Control Unit 20A)

The control unit 20A functions as a computation processing device and a control device, and controls overall operation in the server 2A according to various kinds of programs. The control unit 20A is realized by, for example, an electronic circuit such as a Central Processing Unit (CPU), and a microprocessor. In addition, the control unit 20A may include a Read Only Memory (ROM) for storing a program, a computation parameter and the like that are used, and a Random Access Memory (RAM) for temporarily storing a parameter and the like that change as appropriate.

In addition, the control unit 20A according to the present embodiment also functions as a spot arrangement unit 201A and a spot information transmission control unit 202A.

The spot arrangement unit 201A optimizes arrangement of spot positions on the basis of spot position requests from one or more users. For example, on the basis of requests from a plurality of users, the spot arrangement unit 201A sets a stop (a spot position of service provision) as appropriate within a predetermined range from a reference route of a route bus.

In this manner, after a route of a route bus is determined to some extent (for example, a route connecting between a predetermined stop A and a stop B is set as a reference route), a position of each stop is set at the most suitable place based on the requests from the plurality of users within a predetermined range from the reference route, which enables to carry out route bus traveling having higher convenience for the users.

It should be noted that arrangement processing of arranging a spot position according to the present example (that is to say, spot generation processing) will be specifically described in detail with reference to FIG. 14.

The spot information transmission control unit 202A performs the control in such a manner that information (spot information) related to the spot position determined by the spot arrangement unit 201A is transmitted to each of the user terminals 1.

(Communication Unit 21A)

The communication unit 21A is wiredly or wirelessly connected to the network 3, and transmits/receives data to/from each of the user terminals 1 through the network 3. The communication unit 21A is communicably connected to the network 3 by using, for example, a wired/wireless Local Area Network (LAN), or Wi-Fi (Wireless Fidelity, registered trademark) or the like.

(Storage Unit 22A)

The storage unit 22A is realized by a ROM for storing a program, a computation parameter and the like that are used for processing of the control unit 20A, and by a RAM for temporarily storing a parameter and the like that change as appropriate.

For example, the storage unit 22A according to the present embodiment stores a bus information DB (database) 221A, a spot information DB 222A, and a user information DB 223A.

The bus information DB 221A stores information (a line ID, a line name, stops at start and end points, and reference route information, etc.) of each bus route. In addition, the spot information DB 222A stores information of spot position (in the present example, a position of a stop) in each route, the stop position having been determined by the spot arrangement unit 201A. Moreover, a requested spot position, identification information (a line ID and a traveling ID) of a selected route bus, the request time and the like are stored in the user information DB 223A by being associated with a user ID.

The configuration of the server 2A according to the present embodiment has been specifically described above.

It should be noted that the configuration of the server 2A is not limited to the example shown in FIG. 4. For example, at least a part of the configuration of the server 2A may be located in an external device, or at least a part of each function of the control unit 20A may be realized by an information processing terminal (for example, a so-called edge server, etc.), the communication distance of which is relatively close to the user terminal 1. In this manner, distributing each configuration of the server 2A as appropriate enables to enhance real-time performance, to reduce a processing load, and further to ensure security.

<2-3. Configuration of Bus Device 4A>

Subsequently, a configuration of the bus device 4A included in the information processing system according to the present example will be described with reference to FIG. 5.

Figure 5:
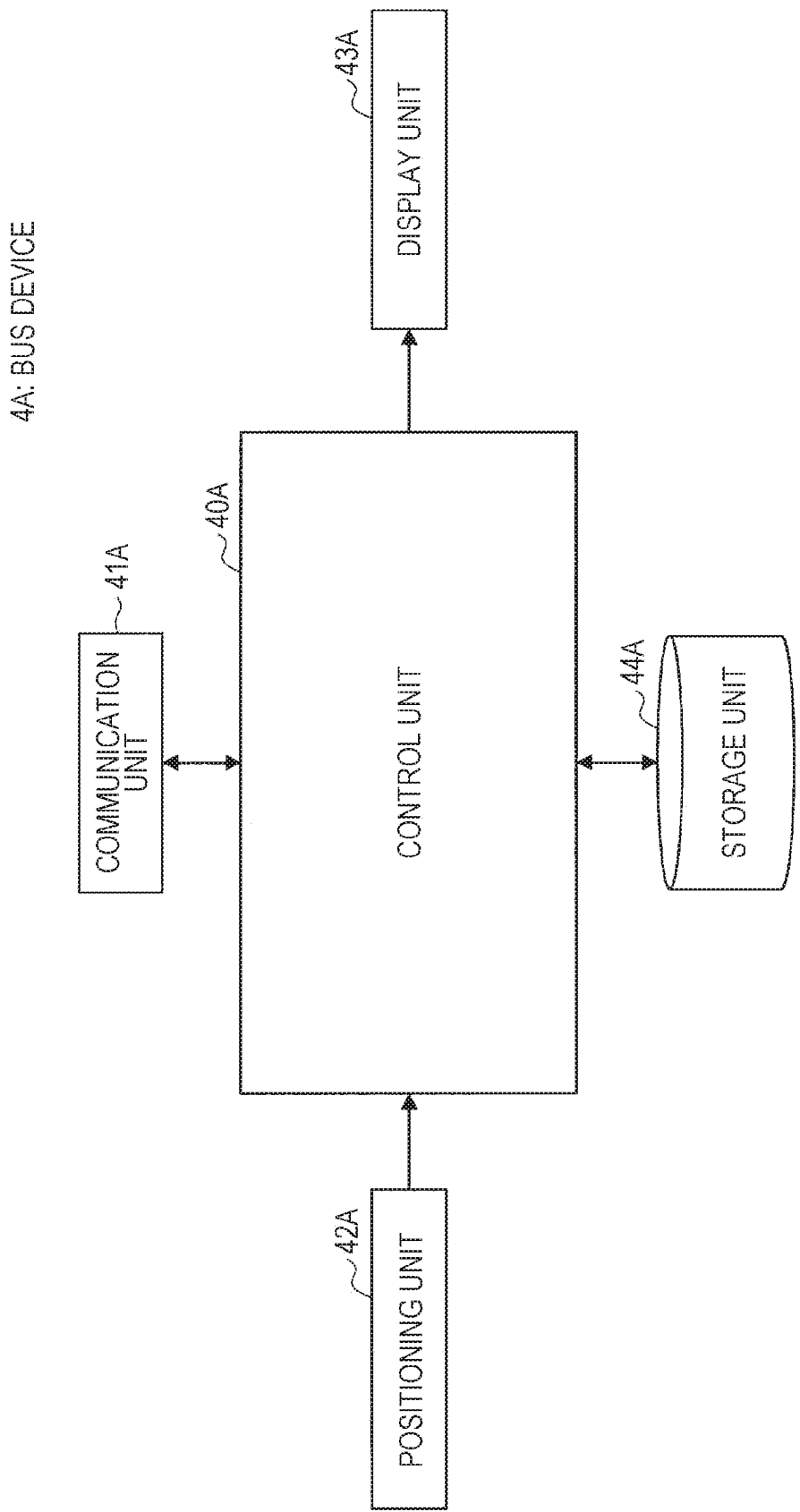
FIG. 5 is a block diagram illustrating an example of a configuration of a bus device according to the first example of the present embodiment.

FIG. 5 is a block diagram illustrating an example of a configuration of the bus device 4A according to the present example. As shown in FIG. 5, the bus device 4A includes a control unit 40A, a communication unit 41A, a positioning unit 42A, a display unit 43A, and a storage unit 44A.

(Control Unit 40A)

The control unit 40A functions as a computation processing device and a control device, and controls overall operation in the bus device 4A according to various kinds of programs. The control unit 40A is realized by, for example, an electronic circuit such as a Central Processing Unit (CPU), and a microprocessor. In addition, the control unit 40A may include a Read Only Memory (ROM) for storing a program, a computation parameter and the like that are used, and a Random Access Memory (RAM) for temporarily storing a parameter and the like that change as appropriate.

In addition, the control unit 40A according to the present embodiment displays spot position information (that is to say, route bus stops), which has been received from the server 2A by the communication unit 41A, on the display unit 43A so as to present the spot position information to a driver. The driver performs traveling so as to go around the presented spot positions. It should be noted that in a case where traveling route information is also transmitted together with the spot position information from the server 2A, the control unit 40A displays the spot position information and the traveling route information on the display unit 43A, and the driver drives according to the presented traveling route.

It should be noted that the control unit 40A according to the present example may further have a function of automatic driving control. In this case, on the basis of the spot position information and the traveling route information that have been received from the server 2A by the communication unit 41A, the control unit 40A performs the automatic driving control of the bus device 4A in such a manner that the bus device 4A travels along a predetermined route, and stops at predetermined spot positions.

(Communication Unit 41A)

The communication unit 41A is wiredly or wirelessly connected to the network 3, and transmits/receives data to/from the server 2A through the network 3. The communication unit 41A is communicably connected to the network 3 by using, for example, a wired/wireless Local Area Network (LAN), or Wi-Fi (Wireless Fidelity, registered trademark) or the like.

(Positioning Unit 42A)

The positioning unit 42A has a function of detecting a current position of the bus device 4A (route bus) on the basis of a signal obtained from the outside. Specifically, for example, the positioning unit 42A is realized by a Global Positioning System (GPS) positioning unit. The positioning unit 42A receives an electrical wave from a GPS satellite to detect a position at which the bus device 4A exists, and outputs detected position information to the control unit 40A. In addition, other than GPS, the positioning unit 42A may be a unit that detects a position by using, for example, Wi-Fi (registered trademark), Bluetooth (registered trademark), by transmission and reception to/from a portable telephone, a PHS, a smart phone or the like, or by short-distance communication or the like.

(Display Unit 43A)

The display unit 43A is a display device that outputs a display screen or the like for displaying spot position information, and route information for going around each spot position. This display unit 43A may be, for example, a display device such as a liquid crystal display (Liquid Crystal Display (LCD)), and an organic Electro Luminescence (EL) display.

(Storage Unit 44A)

The storage unit 44A is realized by a ROM for storing a program, a computation parameter and the like that are used for processing of the control unit 40A, and by a RAM for temporarily storing a parameter and the like that change as appropriate.

The configuration of the bus device 4A has been specifically described above. It should be noted that the configuration of the bus device 4A according to the present example is not limited to the example shown in FIG. 5.

In addition, the bus device 4A may be a bus vehicle itself, or may be a vehicle-mounted device mounted to the bus vehicle. In addition, a bus-mounted device may be removably installed around a driver's seat.

<2-4. Operation Processing>

Subsequently, each operation processing according to the present example will be specifically described with reference to the drawings.

(2-4-1. Acceptance Processing of Accepting a Spot Position Request on the Server Side)

Figure 6:
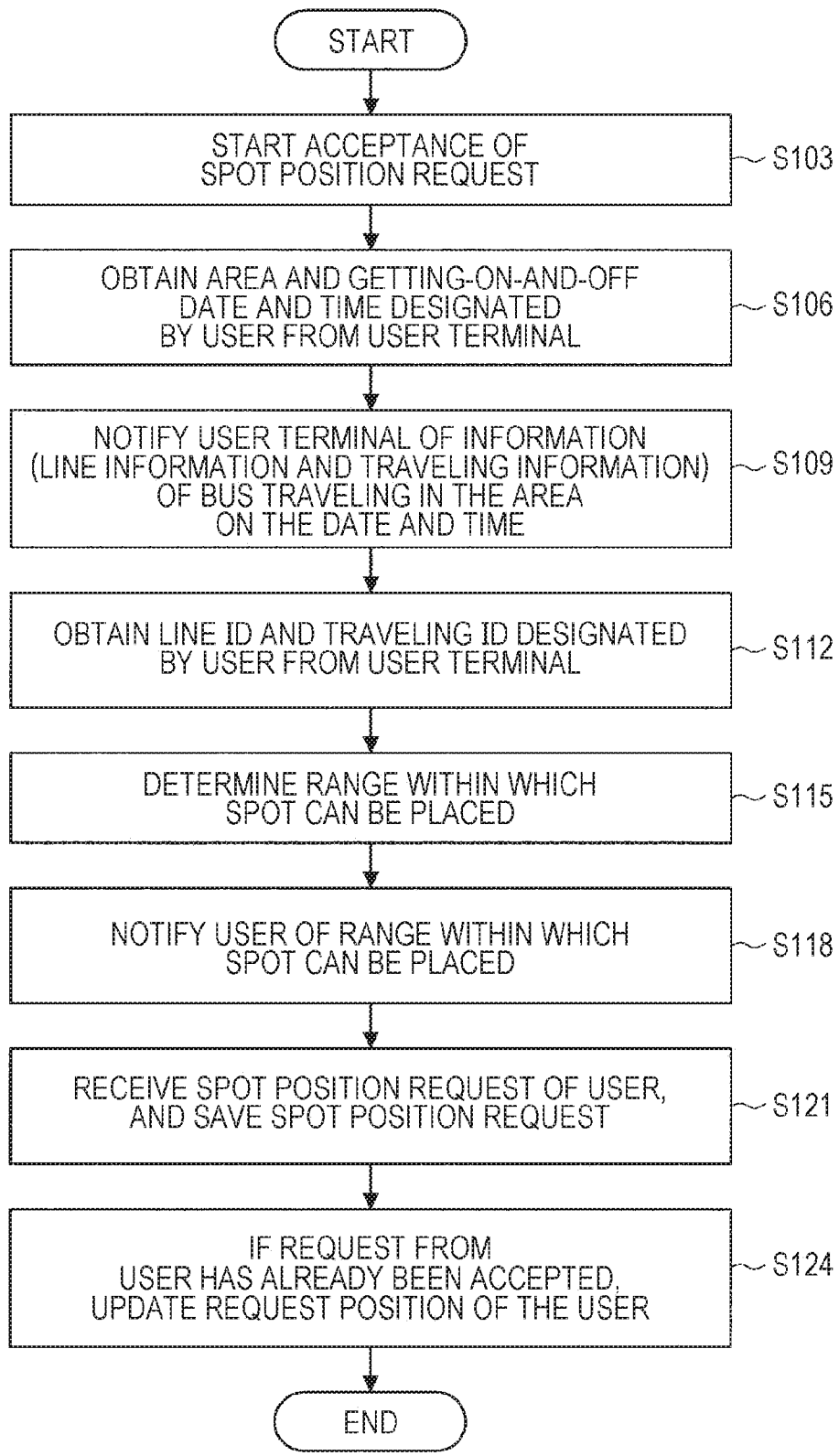
FIG. 6 is a flowchart illustrating acceptance processing of accepting a spot position request by the server according to the first example of the present embodiment.

First of all, acceptance processing of accepting a spot position request by the server 2A will be described with reference to FIG. 6. FIG. 6 is a flowchart illustrating acceptance processing of accepting a spot position request by the server 2A according to the present example.

As shown in FIG. 6, first of all, the server 2A starts acceptance of a spot position request (step S103). The start of acceptance of the spot position request may be set, for example, several days before the day when a bus travels or the like.

Next, the server 2A accepts designation of an area, and designation of getting-on-and-off date and time, from the user terminal 1 (step S106). Specifically, the server 2A obtains designation of the area, and designation of the getting-on-and-off date and time, from the request information received from the user terminal 1. The area can be designated by, for example, the latitude and longitude, and a radius.

Next, the control unit 20A of the server 2A searches the bus information DB 221A for information (including line information and traveling information) of a route bus that travels in the designated area on the designated date and time, and transmits the information to the user terminal 1 (step S109). Here, FIG. 7 illustrates an example of a data configuration of bus information stored in the bus information DB 221A.

As shown in FIG. 7, the bus information includes line information and traveling information, and the line information is associated with the traveling information on a line ID basis. The line information is set for each kind (line) of a route bus, and includes line ID, line name, stop A, stop B, and route information (default route information of a route that connects between a start point and an end point, and that does not stop by at a user designated spot: reference route).

In addition, the line information is associated with the traveling information on a line basis. Buses (traveling) at all of the times for each line are provided with "traveling IDs" as serial numbers. In addition, "direction" in the traveling information is filled with "up" or "down". For example, a bus that runs in a direction from the stop A to the stop B is designated as "up", and a bus that runs in a direction from the stop B to the stop A is designated as "down". In addition, in the case of "up", "departure time" in the traveling information means the date and time of departing from the stop A, and in the case of "down", "departure time" in the traveling information means the date and time of departing from the stop B.

Referring to such bus information, the control unit 20A searches for information of a route bus that travels in an area designated by the user on the date and time designated by the user. More specifically, for example, in a case where the route information is represented by a rectangle (latitude/longitude coordinates), the diagonal line of which is formed by the stop A and the stop B, the control unit 20A may make a determination on the basis of whether or not the rectangle overlaps the area designated by the user.

In addition, in a case where the route information is represented by a latitude/longitude coordinate list of feature points (an intersection, a landmark, etc.) on the reference route, the control unit 20A may make a determination on the basis of whether or not any one of the feature points is included in the area designated by the user.

The route bus information (more specifically, line information, and traveling information corresponding thereto) that has been searched for in this manner is transmitted to the user terminal 1.

Next, the server 2A obtains a line ID and a traveling ID that have been selected by the user from the user terminal 1 (step S112).

Next, on the basis of the line ID and the traveling ID that have been selected, the control unit 20A of the server 2A determines a range within which a spot can be placed (step S115), and notifies the user of the range (step S118). The range within which a spot can be placed may be a range according to a road along a reference route of the selected line, or may be a range that allows to make a detour from the reference route within a predetermined range (a threshold value of the distance is set).

Next, the server 2A receives a spot position request of the user from the user terminal 1, and saves the spot position request in the user information DB 223A as request information (step S121).

It should be noted that in a case where the spot position request received from the user has already been accepted, the server 2A updates request information saved in the user information DB 223A (step S124).

Here, FIG. 8 illustrates an example of request information of each user stored in the user information DB 223A. As shown in FIG. 8, a line ID, a traveling ID, position request date and time (latest), latest request position information (latitude, longitude) that have been selected by the user are stored by being associated with a user ID.

In the example described above, it is assumed that the spot position requested by the user is a position at which the user gets on a bus. However, the user may also similarly request a position at which the user gets off the bus. Irrespective of whether it is getting on or off the bus, a position to be determined as a spot position is merely required on the system side, and therefore a position at which the user gets off the bus can also be similarly determined as a spot position (in this case, two position requests per person are held as request information).

In addition, a bus getting-off position request may be made after the user gets on the bus. In this case, the user may select a stop at which the user wants to get off, for example, from among spot positions (stops) of the bus, which have been already determined, or may press a predetermined button inside the bus in a case where the user wants to get off at the next stop.

The server 2A repeats operation processing described above, and accumulates information of spot position requests from a plurality of users. Subsequently, when a predetermined acceptance time period ends, for example, at 2 o'clock midnight on the day of bus traveling, etc., acceptance is closed, and spot position determination processing is performed. The processing will be described with reference to FIG. 9.

Figures 9, 10:
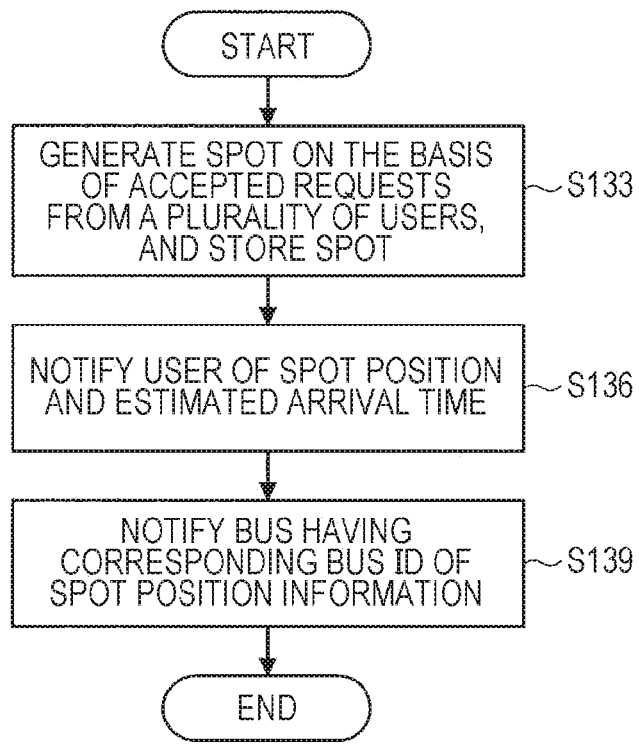
FIG. 9 is a flowchart illustrating spot position notification processing according to the first example of the present embodiment.
FIG. 10 is a drawing illustrating an example of spot information stored in a spot information DB according to the first example of the present embodiment.

FIG. 9 is a flowchart illustrating spot position notification processing according to the present example. As shown in FIG. 9, the server 2A generates spots on the basis of accepted requests from a plurality of users (in the present example, other than arrangement of bus stops, a traveling route may be further determined (calculated)), and stores the spots in the spot information DB 222A (step S133).

The spot generation processing will be described in detail below with reference to FIG. 14. However, the spot arrangement unit 201A of the server 2A summarizes position requests from each user for each traveling ID of a bus, and performs spot generation (arrangement at the most suitable position). Here, FIG. 10 illustrates an example of spot information stored in the spot information DB 222A.

As shown in FIG. 10, the spot information DB 222A stores, as the generated spot information, a spot ID, spot position information (for example, latitude and longitude), a corresponding position request user ID (indicating a user who has made a position request from which the spot information has been generated). Position request users who are registered in the same spot ID are users who have designated the same line ID and the same traveling ID.

Next, the server 2A notifies the user of a position of a spot, and the estimated arrival time of the bus at the position of the spot (step S136). Since the departure time is set as a timetable in the traveling ID, the spot arrangement unit 201A of the server 2A is capable of calculating the estimated arrival time of the bus corresponding to the traveling ID on the basis of the position of the generated spot.

Next, the server 2A notifies the bus corresponding to the traveling ID for which the spot has been generated (more specifically, the bus device 4A) of spot position information (step S139). The notified spot position information is presented to the driver by the bus device 4A.

The processing on the server 2A side has been specifically described above. Subsequently, processing on the user terminal 1 side will be specifically described with reference to FIG. 11.

(2-4-2. Processing on the Terminal Side

Figure 11:
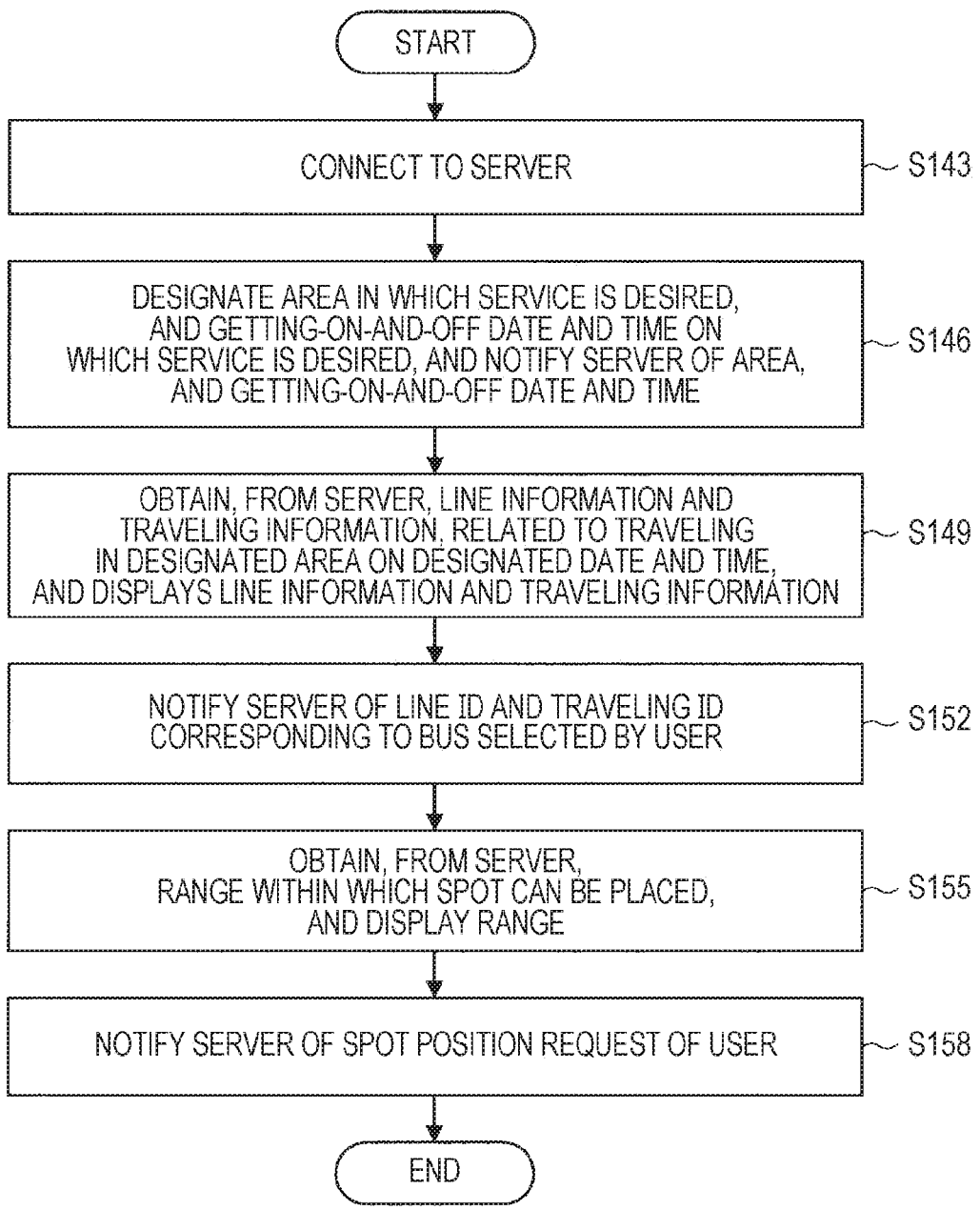
FIG. 11 is a flowchart illustrating operation processing of a position request by a user terminal according to the first example of the present embodiment.

FIG. 11 is a flowchart illustrating operation processing of a position request by the user terminal 1 according to the present example. As shown in FIG. 11, first of all, the user terminal 1 starts an application to connect to the server 2A (step S143).

Next, the user terminal 1 designates an area in which a service is desired, and getting-on-and-off date and time on which a service is desired, and notifies the server 2A of the area and the getting-on-and-off date and time (step S146). Here, FIGS. 12 and 13 each illustrate an example of a request input screen displayed on the user terminal 1.

Figure 12:
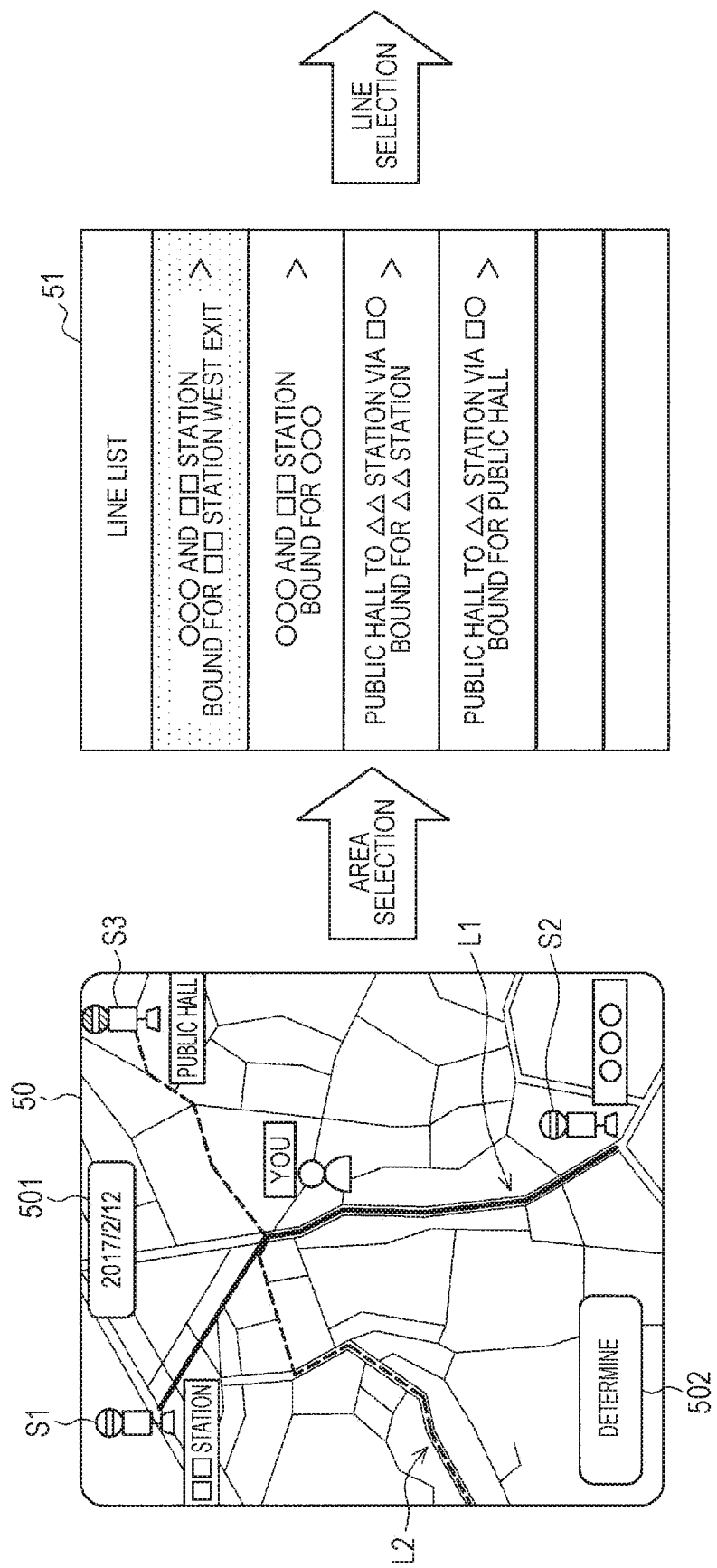
FIG. 12 is a transition diagram illustrating an example of a request input screen displayed on a user terminal according to the first example of the present embodiment.

As shown on the left of FIG. 12, first of all, an input screen 50 on which an area and getting-on-and-off date and time are designated is displayed on the display unit 14 of the user terminal 1. The use taps, for example, a date button 501, and designates, from a displayed calendar, date on which the user wants to get on. In addition, the user moves a displayed map image, and selects an area. An area displayed in an early stage may be an area around the present location of the user (the present location of the user is indicated by an icon with the word "YOU" on the input screen 50). In a case where the user wants to change an area, the user is allowed to change the area by scrolling the map. It should be noted that a range of a displayed area may be, for example, within a range of radius Nm from the center of the map or the like.

In addition, a reference route of a bus, and a reference stop where the bus starts or ends, are displayed on the input screen 50. In an example shown in FIG. 12, for example, a route L1 indicated by a thick line on a map is a reference route of a line connecting between a stop S1 and a stop S2, and a route L2 indicated by a dotted line is a reference route of a line connecting between a stop S3 and a stop (not illustrated) located outside the screen. This enables the user to grasp bus lines that travel through an area in which the user wants to get on and off.

When the user ends the selection of area and getting-on-and-off date and time, the user taps a determination button 502 to determine (confirm) the selection. When the determination button 502 is tapped, the user terminal 1 transmits, to the server 2A, information related to the area and the getting-on-and-off date and time that have been designated (selected) by the user. The area information may be, for example, latitudes/longitudes of four corners of a rectangular map displayed on the screen.

Next, the user terminal 1 obtains, from the server 2A, information related to the line and traveling of a bus that travels in the designated area on the designated date and time, and displays the information (step S149). Specifically, for example, as shown on the right side of FIG. 12, first of all, a line list screen 51 is displayed on the basis of bus line information. When the user designates a line from the line list screen 51, subsequently, as shown on the left side of FIG. 13, a traveling information screen 52 is displayed on the basis of traveling information corresponding to the designated line.

From the traveling information screen 52, the user designates a bus which the user wants to get on (specifically, a time zone in which the bus departs from the starting station). It should be noted that in a case where an area designated by the user has only one line, a line ID may be determined without line selection.

Next, the user terminal 1 notifies the server 2A of a line ID and a traveling ID corresponding to the bus designated by the user (step S152).

Next, the user terminal 1 obtains, from the server 2A, a range within which a spot can be placed, and displays the range (step S155). Specifically, for example, as shown on the right side of FIG. 13, a position request screen 53 showing a range (spot position request allowable range) 531 within which a spot can be placed is displayed. The user designates a spot position within the spot position request allowable range 531 (request of a spot position). On the position request screen 53 shown in FIG. 13, a spot position designated by the user is indicated by an icon 532.

Subsequently, the user terminal 1 notifies the server 2A of the spot position request by the user (step S158). Specifically, the user terminal 1 transmits, to the server 2A, latitude/longitude information of the spot position designated by the user.

Specific processing of a position request in the user terminal 1 has been described above.

(2-4-3. Spot Generation Processing)

Figure 15:
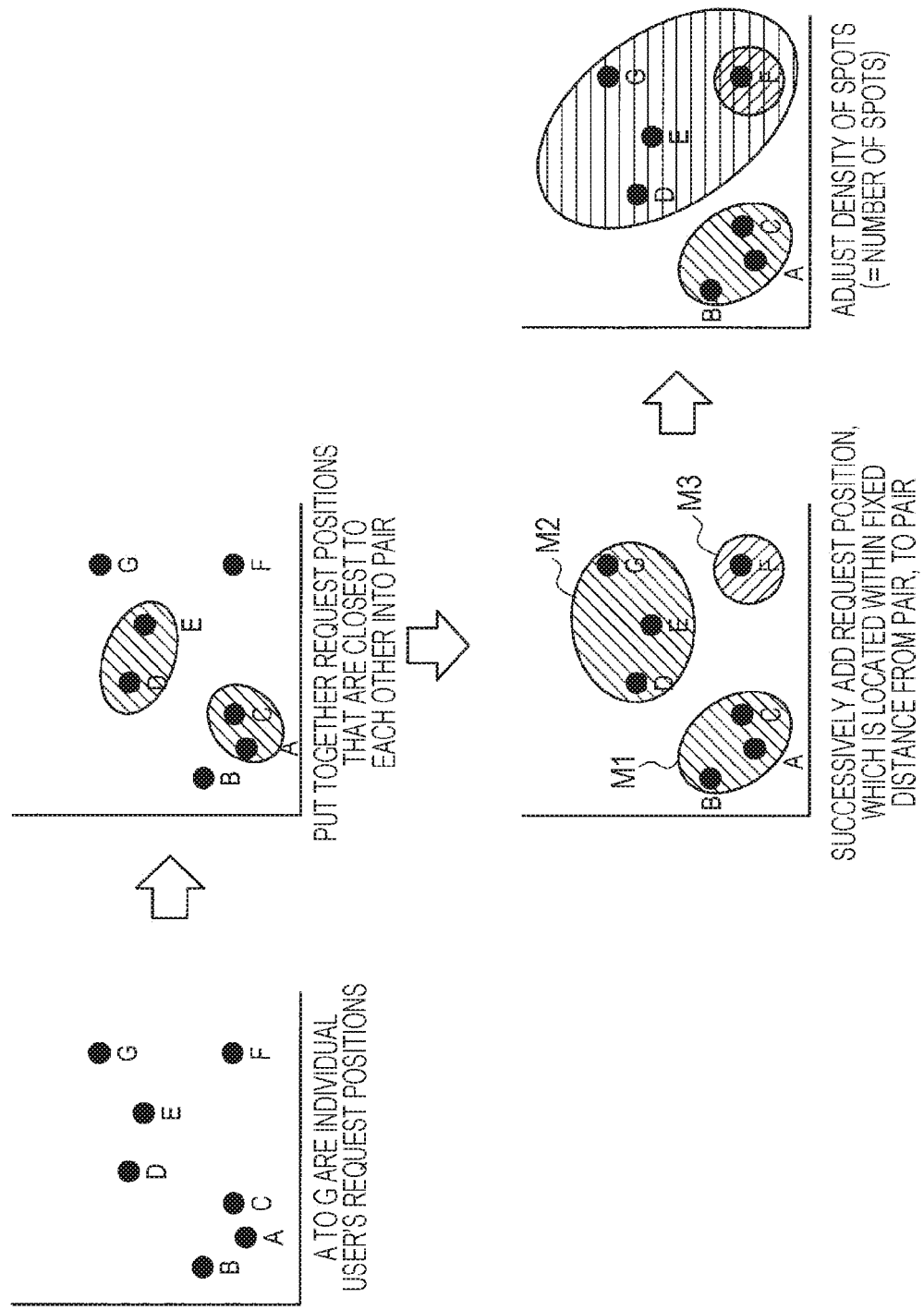
FIG. 15 is a drawing illustrating an example of clustering of a request position according to the first example of the present embodiment.
Figure 16:
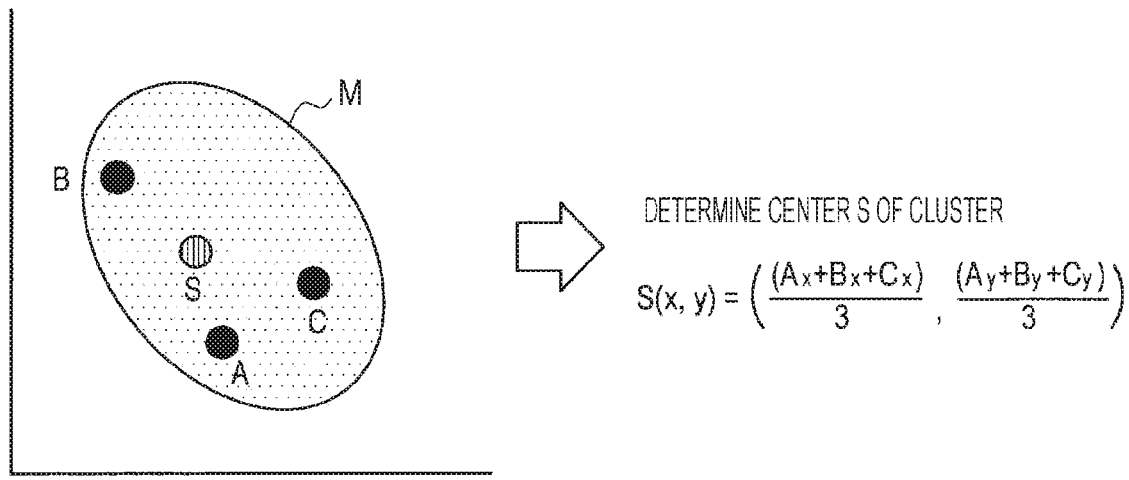
FIG. 16 is a drawing illustrating a calculation example of calculating the center of a cluster according to the first example of the present embodiment.

Subsequently, spot generation processing based on position requests from a plurality of users according to the present example will be specifically described with reference to FIGS. 14 to 16.

Figure 14:
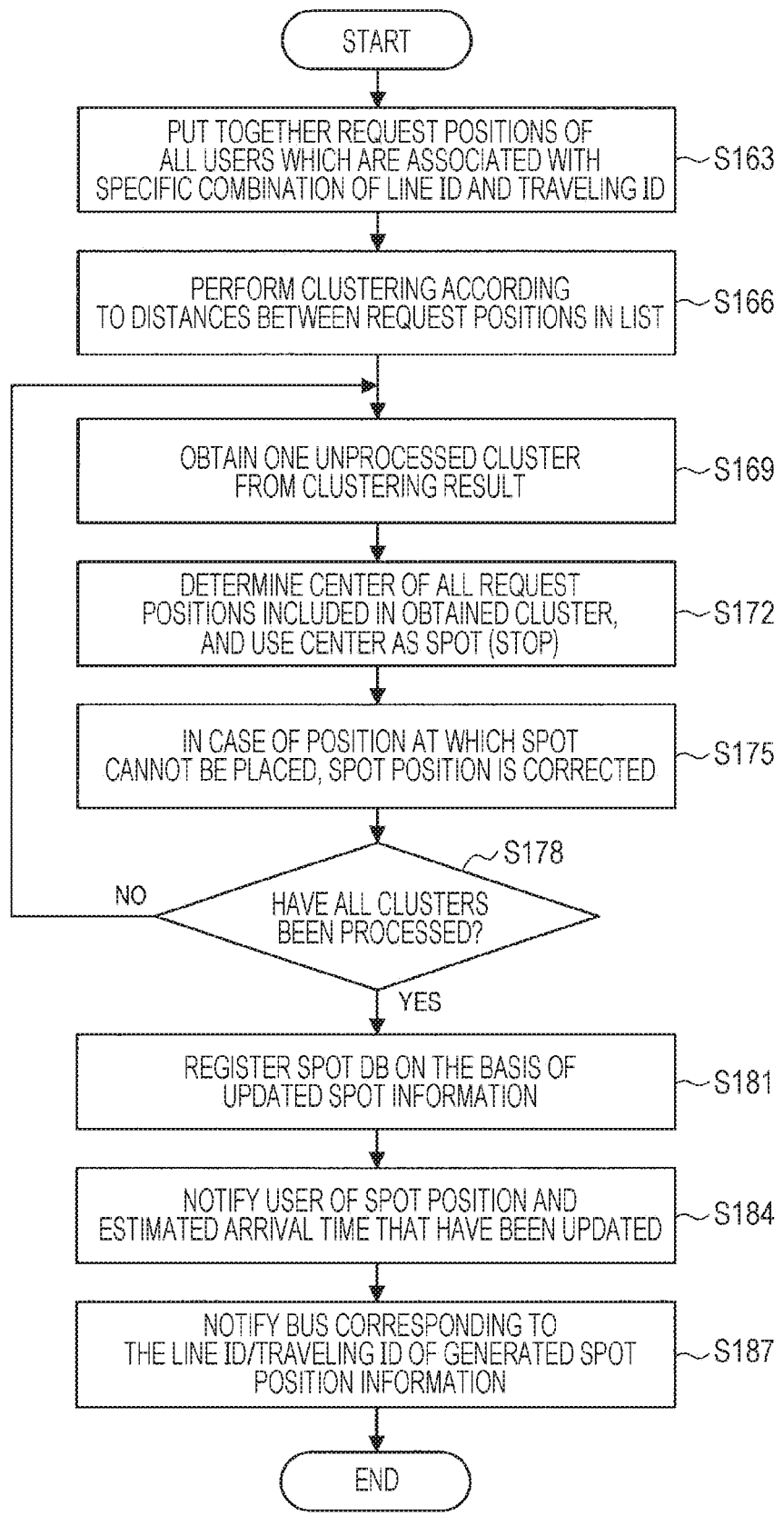
FIG. 14 is a flowchart illustrating spot generation processing according to the first example of the present embodiment.

FIG. 14 is a flowchart illustrating spot generation processing according to the present example. As shown in FIG. 14, first of all, the spot arrangement unit 201A of the server 2A extracts, from the user information DB 223A, request positions (in other words, positions at which spot positions are requested) of all users, which are associated with a specific combination of a line ID and a traveling ID, and put together (for example, list) the request positions (step S163). In the present example, as an example, a bus (traveling ID) is selected by the user.

Next, the spot arrangement unit 201A performs clustering according to distances between request positions in the list into which the requested positions are put together, and puts together request positions, which are close in distance, into a cluster (step S166). Although a clustering technique is not particularly limited, for example, hierarchical clustering may be used (for example, Ward method is used for a distance function).

The hierarchical clustering generates a group (cluster) from the most similar combination in order, and is capable of representing an in-process process like a layer. A tree diagram (dendrogram) is finally completed. In the ordinary hierarchical clustering, cluster coupling is continued until the top node of the tree diagram becomes one (in other words, until the number of clusters is one). However, in the present example, cluster coupling may be interrupted in a moderate stage. It is assumed that the "moderate stage" is, for example, a case where a distance between clusters becomes a fixed level or more, or a range within which the number of clusters (that is to say, the number of spots) does not exceed the fixed number.

Here, an example of clustering of request positions will be described with reference to FIG. 15. As shown in FIG. 15, first of all, in a case where there are individual user's request positions A to F, request positions that are closest to each other in distance are put together as a pair.

Next, a request position that is located within a fixed distance from the pair is successively added to the pair. In this case, each cluster may include two or more points (request positions). However, there is also a case where a cluster is constituted of only one request position. In the example shown in FIG. 15, three clusters M1 to M3 (that is to say, three spot positions) are formed.

It should be noted that the number of spots decreases by increasing a threshold value of the distance within which spot positions are put together as a cluster, or by performing clustering further up to an upper level layer, and therefore the density (number) of spots in the area can be adjusted.

Next, the spot arrangement unit 201A obtains one unprocessed cluster from a clustering result (step S169), determines the center of all request positions included in the obtained cluster, and uses the center as a spot position (bus stop) (step S172). The center may be calculated, for example, by simply obtaining an average of latitudes/longitudes of a plurality of position requests in the same cluster.

Here, an example of calculating the center of a cluster will be described with reference to FIG. 16. As shown in FIG. 16, the center S (latitude/longitude) can be determined, for example, by adding the latitude and the longitude of each of all request positions in a cluster M, and then by dividing the latitude and the longitude by the number of request positions.

Next, there is a possibility that only simple determination of the center will result in a place in which a spot cannot be arranged (such as a place having no road). Therefore, in this case, the spot arrangement unit 201A makes a correction in such a manner that the spot is moved to a spot arrangeable place that is closest to the determined latitude/longitude of the center (step S175).

Subsequently, the spot arrangement unit 201A subjects all clusters to the processing shown in the steps S169 to S175 described above (step S178). When hierarchical clustering is used, the number of classifications of clusters becomes undefined (in the case of non-hierarchical clustering such as the k-means method, which is also one of clustering techniques, calculation is performed after the number of clusters is determined beforehand). Therefore, in order to subject all clusters to the processing, an unprocessed class is successively obtained in the step S169 to repeat the processing.

Next, when all clusters have been subjected to the processing (step S178/Yes), the spot arrangement unit 201A gives an ID to each generated spot again, and registers the spot in the spot information DB together with a user's ID that is associated with the cluster for which the spot has been generated. In this case, the spot arrangement unit 201A may calculate and record the estimated arrival time to the spot. The estimated arrival time can be calculated by using an existing technique that is used in a car navigation system or the like.

Next, the spot information transmission control unit 202A of the server 2A notifies the user of the updated spot position and the estimated arrival time (step S184). Here, FIG. 17 illustrates an example of a spot information screen presented to the user in the user terminal 1.

Figure 17:
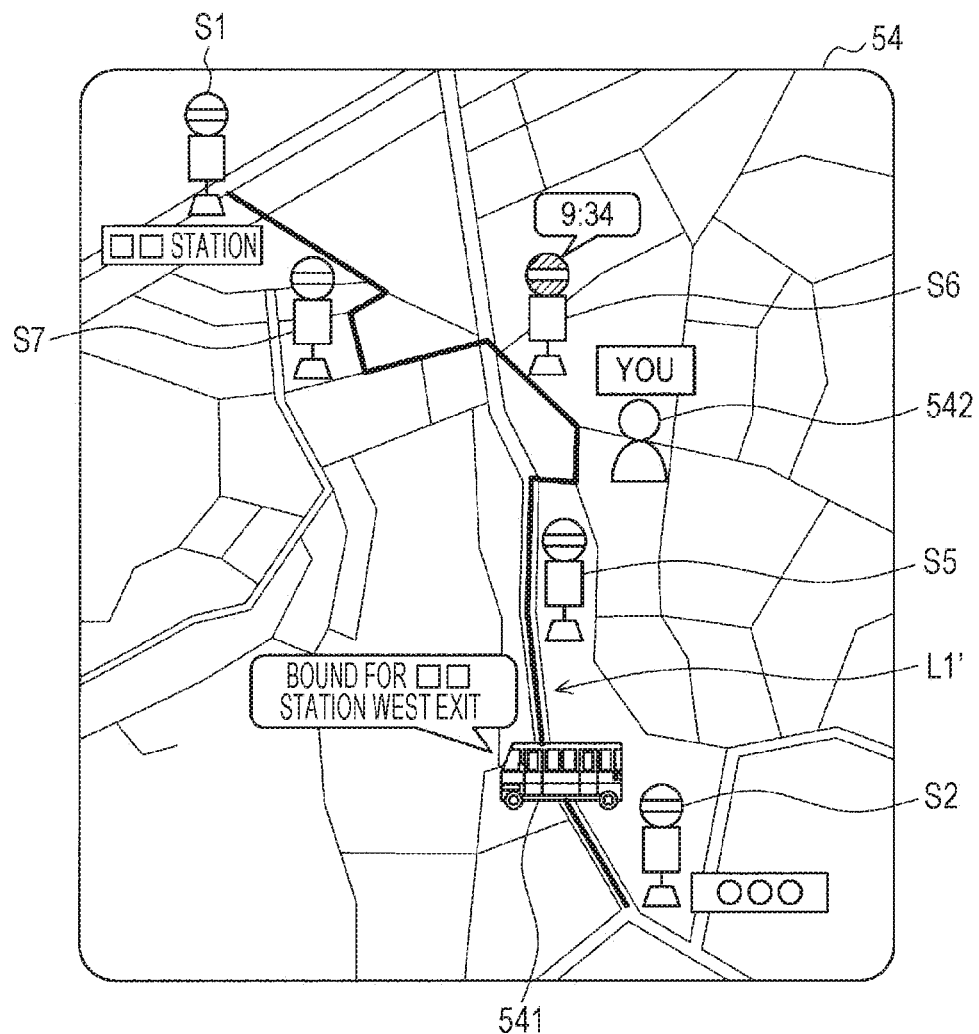
FIG. 17 is a drawing illustrating an example of a spot information screen presented to a user on the user terminal according to the first example of the present embodiment.

As shown in FIG. 17, the spot information screen 54 displays: spots (stops S5 to S7) generated on the basis of position requests of a plurality of users; a route L1' that goes around the generated spots; and the estimated arrival time of the bus to the spot (the stop S6) generated on the basis of the position requests of the users. In addition, as shown in FIG. 17, the spot information screen 54 may be adapted to further display an icon 541 that indicates a present location of the bus, and an icon 542 that indicates a present location of the user.

In addition, the spot information transmission control unit 202A notifies the bus (the bus device 4A) corresponding to the line ID and the traveling ID of the generated spot position information (step S187). This enables a driver of the bus to grasp a place that has been determined as a stop (spot position). Moreover, the server 2A may also calculate a route going around the generated spot positions, and the target time at which the bus goes around each stop, and may notify the bus of the route and the target time. In a case where the bus device 4A performs automatic driving, the bus device 4A is subjected to automatic driving control according to the route going around the spot positions, and the target time at which the bus goes around each stop, the route and the target time having been notified by the server 2A.

The generation of spot positions according to the present example has been specifically described above.

3. Second Example

Subsequently, a second example according to the present embodiment will be described.

In recent years, services for providing users with entertainment content by combining a real location and a virtual game or an animation world are achieving widespread use, the services including: "butaimeguri (scene hunting)" that actually visits a place that has been used as a model in a movie, a drama, or an animation; a "position game" that is a game that progresses on the basis of a current position of a user; and the like. The information processing system according to the present embodiment can be applied to such a service for providing content that is associated with a position, and thus a spot position of service provision can be most suitably arranged.

For example, in the "scene hunting", on the basis of requests of animation fans, it is possible to set a place that is closely associated with a stage or a character in an animation, the place being called "sacred place". In the past, a content provider is obliged to set a "sacred place" by determining the sacred place beforehand, or by summarizing places that are frequently requested from users using man power, on the content provider side. However, applying the present embodiment enables to automatically and dynamically install a "sacred place".

Usually, sacred places are often associated with specific landmarks, and therefore it is also assumed that the sacred places are incompatible with the center of position requests of a plurality of users. However, it is often the case that "this character frequently appears in this vicinity in an animation" (a second sacred place is also assumed, for example, a place that is discovered by a user by himself/herself, a similar place or the like). Further, it is considered that in a case where users make respective position requests, a range of positions becomes wider. Therefore, application of the information processing system according to the present embodiment is useful.

As the result, fans can set sacred places all together, and can increase the number of sacred places. This also extends the range of places visited by tourists, leading to regional activation. In the set "sacred place", it is assumed that users are provided with services, for example: allowing a user to subject a corresponding character to Augmented Reality (AR) displaying; allowing a user to take a commemorative photograph with a corresponding character; and the like.

In addition, with respect to the position game as well, similarly, for example, a position at which a monster makes an entrance, a position at which an item makes an entrance, a position of a symbolic landmark of the game, and the like, can be set on the basis of requests of a plurality of users.

An information processing system according to the second example that is applied to such a service for providing content that is associated with a position has a system configuration that includes the user terminal 1 and a server 2B. The user terminal 1 and the server 2B are connected to each other through the network 3, and therefore data can be transmitted/received therebetween. A configuration of the user terminal 1 is similar to that of the user terminal 1 according to the first example described with reference to FIG. 3, and therefore detailed description thereof will be omitted here.

<3-1. Configuration of Server 2B>

Figure 18:
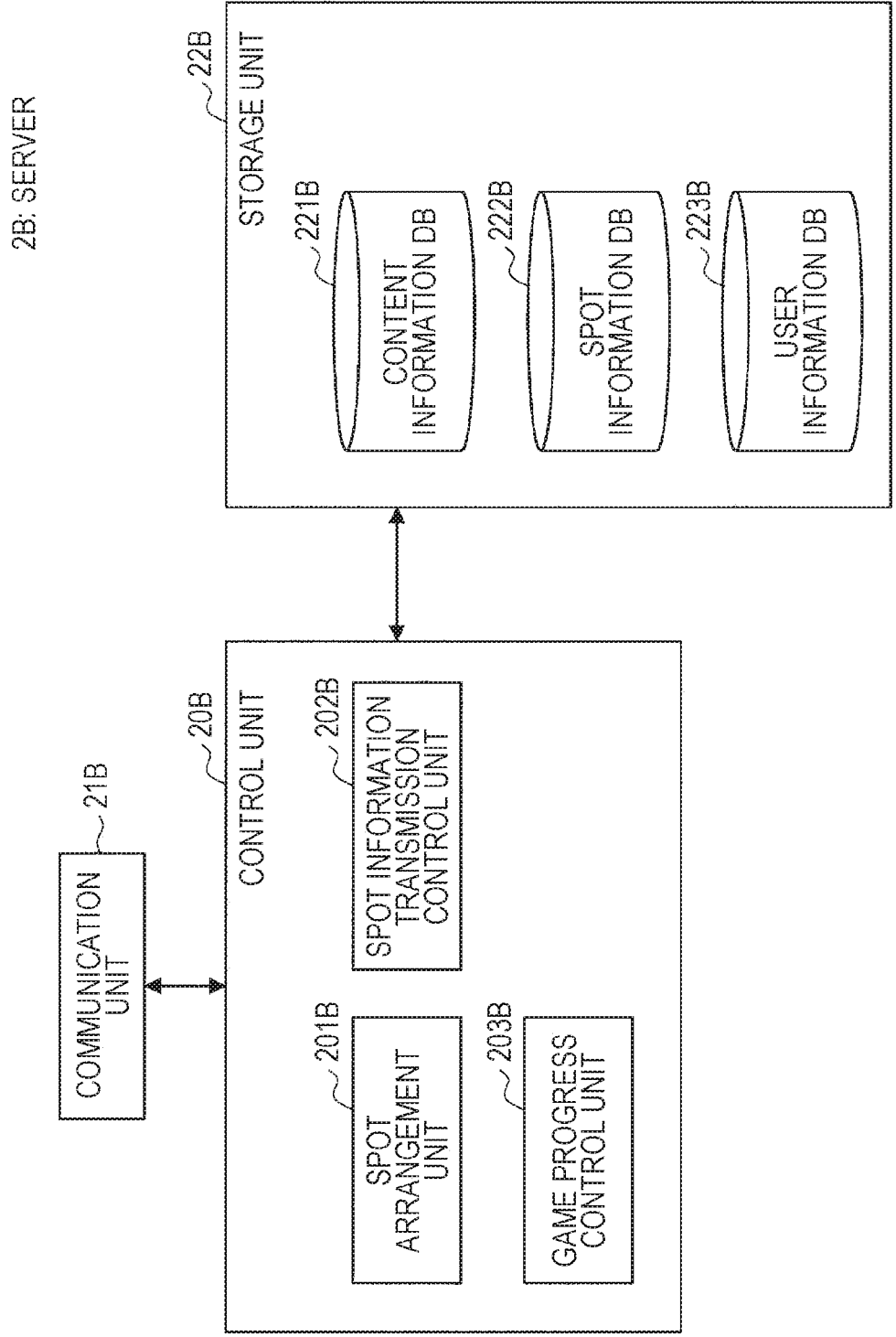
FIG. 18 is a block diagram illustrating an example of a configuration of a server according to a second example of the present embodiment.

FIG. 18 is a block diagram illustrating an example of a configuration of the server 2B according to the second example. As shown in FIG. 18, the server 2B includes a control unit 20B, a communication unit 21B, and a storage unit 22B.

(Control Unit 20B)

The control unit 20B functions as a computation processing device and a control device, and controls overall operation in the server 2B according to various kinds of programs. The control unit 20B is realized by, for example, an electronic circuit such as a Central Processing Unit (CPU), and a microprocessor. In addition, the control unit 20B may include a Read Only Memory (ROM) for storing a program, a computation parameter and the like that are used, and a Random Access Memory (RAM) for temporarily storing a parameter and the like that change as appropriate.

In addition, the control unit 20B according to the present embodiment also functions as a spot arrangement unit 201B, a spot information transmission control unit 202B, and a game progress control unit 203B.

The spot arrangement unit 201B optimizes arrangement of spot positions on the basis of spot position requests from one or more users. Spot position arrangement processing (that is to say, spot generation processing) will be specifically described in detail with reference to FIG. 25.

The spot information transmission control unit 202B performs the control in such a manner that information (spot information) related to the spot position determined by the spot arrangement unit 201B is transmitted to each of the user terminals 1. It should be noted that since a spot position is arranged on the basis of requests from a large number of users, there is also a case where even if a user newly makes a position request, the reflection of the position request is only a very short distance. Therefore, the spot information transmission control unit 202B may be adapted to make a notification notifying of updated contents, for example, "moved by xxx m" or the like, at the same time.

The game progress control unit 203B controls progress of the game, and transmits a notification related to a game screen and the game to the user terminal 1 as appropriate. It should be noted that here, in order to explain the server 2B that provides users with a position game service as an example, the game progress control unit 203B is included. However, the present example is not limited to this. In the case of the server 2B that provides users with a "scene hunting" service, a service provision control unit that provides a service for, for example, when a user visits a determined spot position, causing a predetermined character to make an entrance with the character subjected to AR displaying or the like, may be included as an alternative to the game progress control unit 203B.

(Communication Unit 21B)

The communication unit 21B is wiredly or wirelessly connected to the network 3, and transmits/receives data to/from each of the user terminals 1 through the network 3. The communication unit 21B is communicably connected to the network 3 by using, for example, a wired/wireless Local Area Network (LAN), or Wi-Fi (Wireless Fidelity, registered trademark) or the like.

(Storage Unit 22B)

The storage unit 22B is realized by a ROM for storing a program, a computation parameter and the like that are used for processing of the control unit 20B, and by a RAM for temporarily storing a parameter and the like that change as appropriate.

In addition, for example, the storage unit 22B according to the present embodiment stores a content information DB 221B, a spot information DB 222B, and a user information DB 223B.

Information of a character that makes an entrance by being associated with a position is stored in the content information DB 221B. In addition, the spot information DB 222B stores information of a spot position (in the present example, a position at which a character makes an entrance) determined by the spot arrangement unit 201B. Moreover, a requested spot position, the request time and the like are stored in the user information DB 223B by being associated with a user ID.

The configuration of the server 2B according to the present embodiment has been specifically described above. It should be noted that the configuration of the server 2B is not limited to the example shown in FIG. 18. For example, at least a part of the configuration of the server 2B may be located in an external device, or at least a part of each function of the control unit 20B may be realized by an information processing terminal (for example, a so-called edge server, etc.), the communication distance of which is relatively close to the user terminal 1. In this manner, distributing each configuration of the server 2B as appropriate enables to enhance real-time performance, to reduce a processing load, and further to ensure security.

<3-2. Operation Processing>

Subsequently, each operation processing according to the present example will be specifically described with reference to the drawings.

(3-2-1. Acceptance Processing of Accepting a Spot Position Request on the Server Side)

Figure 19:
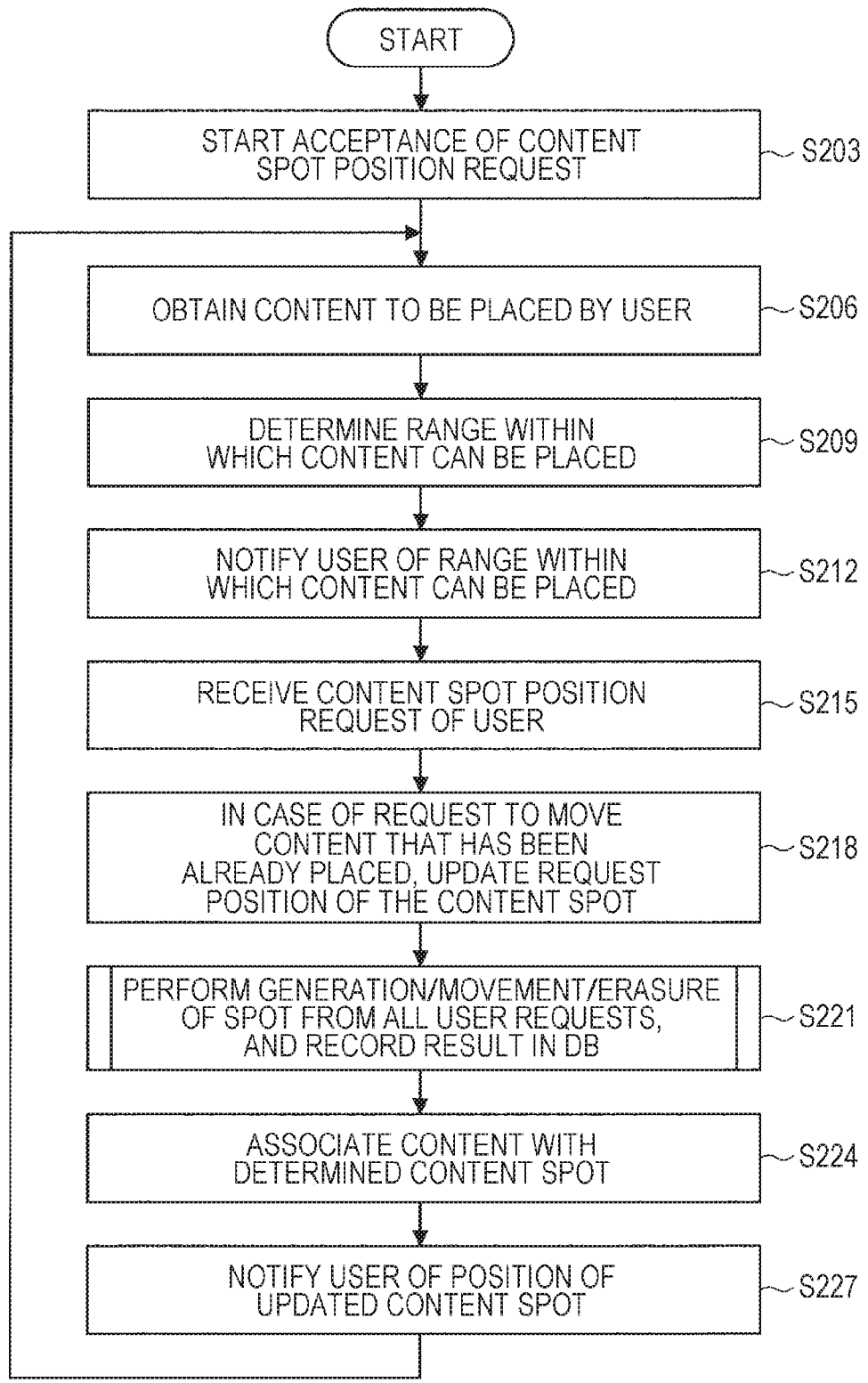
FIG. 19 is a flowchart illustrating acceptance processing of accepting a spot position request by the server according to the second example of the present embodiment.

First of all, acceptance processing of accepting a spot position request by the server 2B will be described with reference to FIG. 19. FIG. 19 is a flowchart illustrating acceptance processing of accepting a spot position request by the server 2B according to the present example.

As shown in FIG. 19, first of all, the server 2B starts acceptance of a content spot position request (step S203). It should be noted that in the scene hunting or the position game, a spot position request from a user may be always accepted.

Next, on the basis of a position request from a user, the server 2B obtains content to be placed by the user from the content information DB 221B (step S206). With respect to the position request according to the present example, in the case of scene hunting, a character is selected by the user, and in the case of a position game, a monster or an item is selected by the user.

Next, the server 2B determines a range within which the content can be placed (step S209). The range within which the content can be placed may be a preset range within which a user can act in the scene hunting (for example, a specific area, city, town or village, prefecture, etc.), or in the case of a position game, the range may be limited according to the content (a monster or an item) (for example, a water monster is adapted to appear only along a river, or the like).

Next, the server 2B notifies the user of a position range within which the content can be placed (step S212). On the user terminal 1 side, a request position of the content is designated by the user from the position range within which the content can be placed.

Next, the server 2B receives, from the user terminal 1, a content position request (in other words, a request of a position at which a game character makes an entrance, or a request to register a sacred place) (step S215). It should be noted that the content position request may be adapted to be accepted only once a day, or may be adapted to be disallowed unless the user visits the site (in other words, the content position request may be adapted to be allowed only at the present location).

Subsequently, in a case where a position request of a user has already been accepted for the same content, the server 2B limits the number of times for the user, or if a request position is changed, the server 2B updates the position (step S218). The position request from each user is saved in the user information DB 223B. An example of position request information saved in the user information DB 223B is shown in FIG. 20.

As shown in FIG. 20, in a case where a spot has been determined, a spot ID (a content ID may be registered until the determination) is included in position request information, and position request time (latest), and latest request position (latitude/longitude) are further included in the position request information, with the spot ID, the position request time (latest), and the latest request position (latitude/longitude) associated with a user ID.

Next, the server 2B generates, moves, or erases a content spot on the basis of position requests of all users for specific content, and records a result thereof in the content information DB 221B (step S221).

As illustrated in FIG. 21, information of a character, a game monster, an item and the like is registered in the content information DB 221B as content information by being associated with an content ID. In a case where a place (spot position) in which an entrance is made has already been determined, a spot ID is also registered. It is also assumed that there is a plurality of spot IDs (the same character makes an entrance in a plurality of places). It should be noted that spot generation according to the present example will be described below in detail with reference to FIG. 25.

Next, the server 2B associates the content with the determined content spot (spot position) (step S224). Specifically, the server 2B associates the spot position, the user ID of the user who has made the position request, and the content ID, and registers (updates) the information in the spot information DB 222B. Here, FIG. 22 illustrates an example of spot information stored in the spot information DB 222B. As shown in FIG. 22, a spot position (latitude/longitude), a user ID of a user who has made a position request (in a case where the number of users who have made position requests is two or more, a plurality of user IDs), a registered content ID, and information related to whether or not the spot is an official spot, are included in the spot information by being associated with a spot ID.

It should be noted that for reasons of scene hunting or a game, instead of causing the content to appear at the spot position immediately, the content may be caused to appear in a case where a user fulfills date and time conditions or some kind of condition. For example, in the case of scene hunting, in a case where a user has already gone around essential spots, the content may be caused to appear. In the case of the position game, in a case where a user has already achieved a required level, or in a case where the user has a specific item, the content may be caused to appear. Such an appearance condition can also be registered in the content information DB 221B.

Subsequently, the server 2B notifies the user of a position of the updated content spot (step S227).

The acceptance processing according to the present example has been specifically described above.

(3-2-2. Processing on the Terminal Side)

Figure 23:
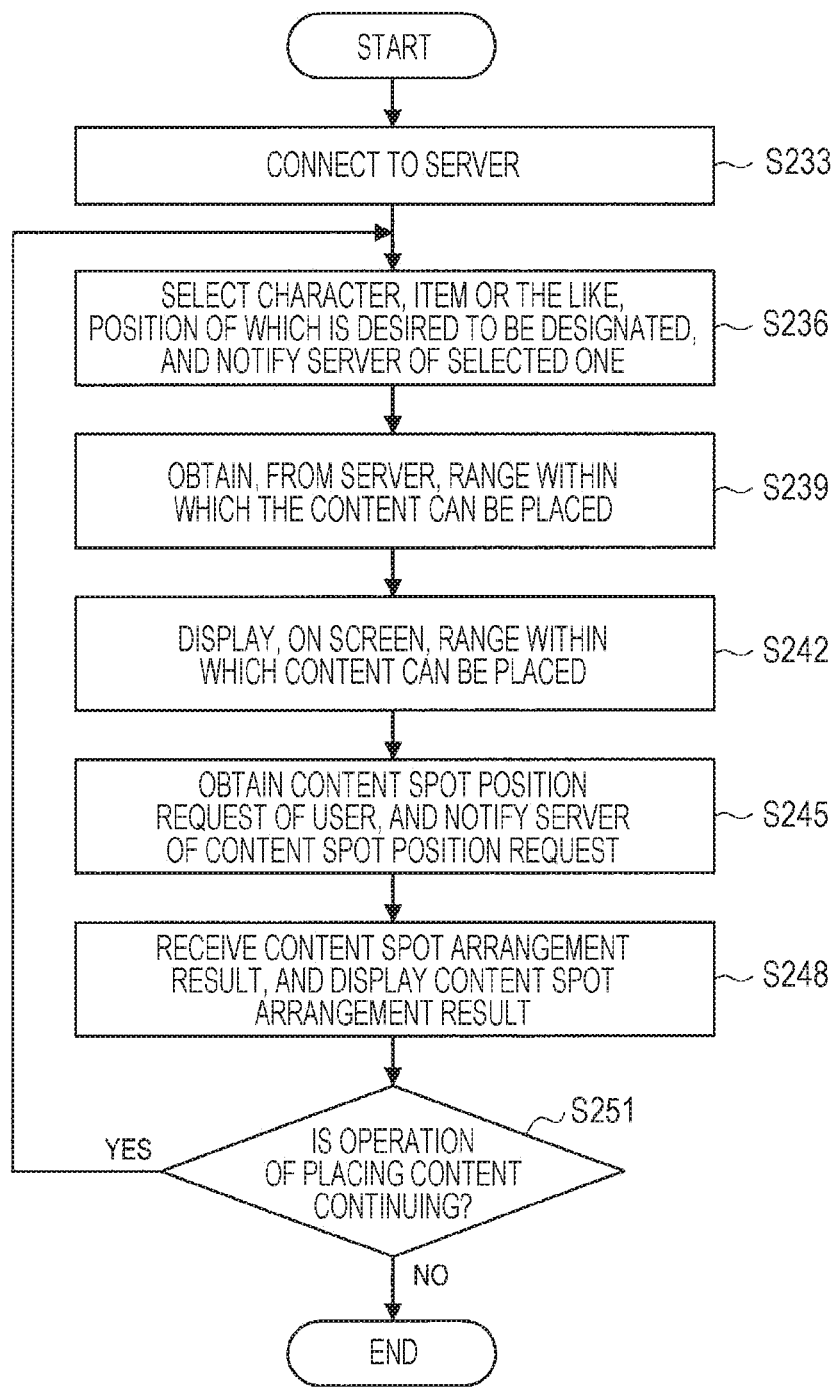
FIG. 23 is a flowchart illustrating operation processing of a position request of a user terminal according to the second example of the present embodiment.

Subsequently, operation processing on the user terminal 1 side will be described with reference to FIG. 23. FIG. 23 is a flowchart illustrating operation processing of a position request by the user terminal 1 according to the present example.

As shown in FIG. 23, first of all, the user terminal 1 starts an application to connect to the server 2B (step S233).

Next, the user terminal 1 selects content such as a character and an item, the position of which is desired to be designated, and notifies the server 2B of the content (step S236). Specifically, the user terminal 1 displays a selection screen of the content, the position of which is desired to be designated, and transmits an ID of the content selected by the user to the server 2B.

Next, the user terminal 1 obtains, from the server 2B, a range within which the content can be placed (step S239), and displays, on a screen, the range within which the content can be placed (step S242). Specifically, the user terminal 1 highlights the range within which the content can be placed on a map, and displays a text explaining the range within which the content can be placed (for example, "A monster having a water property can be placed only on the waterside", or the like). With respect to the range within which the content can be placed, for example, a content arrangeable range around the present location of the user may be displayed by priority, or the user may be allowed to scroll a screen, or to input an address or a place name, so as to look for a content arrangeable range in an arbitrary area.

Next, the user terminal 1 obtains a content spot position request made by the user, and transmits the content spot position request to the server 2B (step S245).

Next, the user terminal 1 receives a content spot arrangement result from the server 2B, and displays the content spot arrangement result (step S248). Specifically, the user terminal 1 may display a content arrangement screen 60 as shown in, for example, FIG. 24. On the content arrangement screen 60 shown in FIG. 24, monster images P1 to P3 are displayed by being superimposed on a map image, which enables the user to grasp spot positions (monster appearance positions).

It should be noted that a display mode may be changed on the content arrangement screen 60 so as to enable the user to know, for example, whether the presented spot is an official spot or a spot that has been set on the basis of a position request of the user (an unofficial spot that has been set on the basis of a position request from a general user), or the like. In the example shown in, for example, FIG. 24, in the case of an official spot, an "official" mark is given. In the case of a spot that is associated with a user request, a "star" mark is given.

In addition, even in a case where there is no spot position request made by a user, there is a possibility that a spot will be updated on the basis of a content spot position request made by other user. Therefore, the user terminal 1 may obtain content spot arrangement results to update the screen at predetermined intervals. Alternatively, in a case where an update has been made, the server 2B makes an update notification of a spot position request, and the screen may be updated at every notification.

In addition, the user terminal 1 repeats the processing of the steps S236 to S248 according to user's operation (operation of arranging other contents, content moving operation, etc.) (step S251).

(3-2-3. Spot Generation Processing)

Next, spot generation processing according to the present example will be described with reference to FIG. 25. The spot generation processing according to the present example is mostly similar to that of the first example, and therefore will be simply described.

Figure 25:
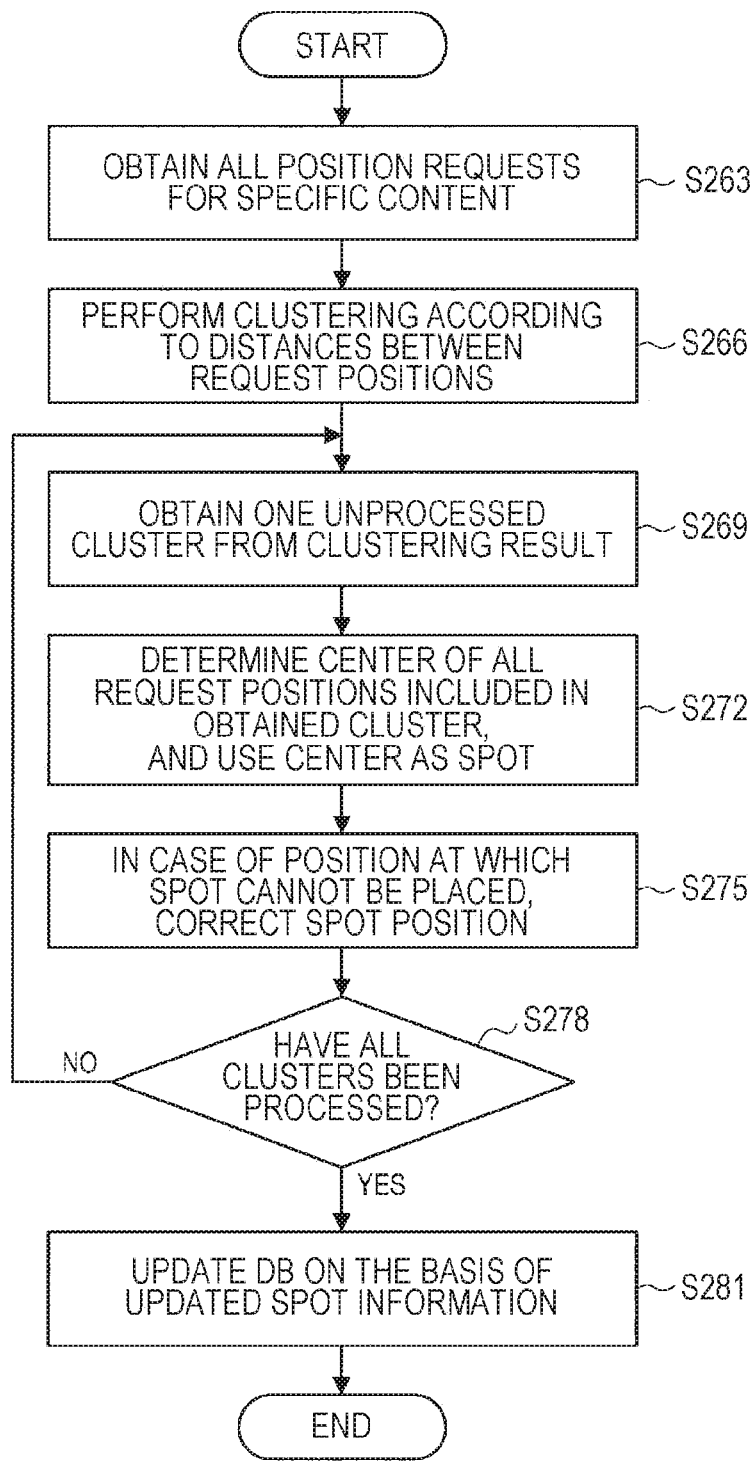
FIG. 25 is a flowchart illustrating spot generation processing according to the second example of the present embodiment.

FIG. 25 is a flowchart illustrating spot generation processing according to the present example. As shown in FIG. 25, first of all, the spot arrangement unit 201B of the server 2B obtains all current position requests for specific content (step S263).

Next, the spot arrangement unit 201B performs clustering according to distances between request positions, and puts together position requests, which are close in distance, into a cluster (step S266). Details of clustering are similar to those of the first example, and therefore a detailed description thereof will be omitted.

Next, the spot arrangement unit 201B obtains one unprocessed cluster from a clustering result (step S269), determines the center of all request positions included in the obtained cluster, and uses the center as a spot (step S272). The calculation of the center is also similar to that of the first example, and therefore a detailed description thereof will be omitted.

Next, there is also a possibility that only simple determination of the center will result in a place in which a spot cannot be placed (a place having no road, a private land, a dangerous place, etc.). Therefore, the spot arrangement unit 201B moves the spot to a spot placeable place that is closest to the latitude/longitude of the center (step S275).

Next, the spot arrangement unit 201B repeats the processing of the steps S269 to S275 until all clusters have been subjected to the processing (step S278).

Subsequently, when all clusters have been subjected to the processing (step S278/Yes), the spot arrangement unit 201B gives an ID to each generated spot again, and registers (updates) the spot in the spot information DB 222B together with a user's ID that is associated with the cluster for which the spot has been generated (step S281).

The above-described processing can be performed in a case where a position request is received from a user, can be performed at regular time intervals, or can be performed on a content basis. Depending on fluctuations in position request from each user, it looks as if a spot is generated (newly), moved, or erased in appearance.

For example, when a new position request is input at a position at which there has been no spot until now, a new cluster is made, and consequently a spot is newly generated.

In addition, in a case where a new request is input into an existing cluster, which causes a spot position to change, the spot position has moved as the result.

Moreover, if a user cancels a position request (cancel request), or changes a request to a position that belongs to another cluster, which causes a cluster to disappear, the spot is erased as the result.

The generation of spot positions according to the present example has been specifically described above.

It should be noted that in the present example, there has been explained the example in which in a case where a user is provided with entertainment by combining a real location and a virtual game or an animation world, the present system is applied. However, the present system is capable of similarly performing a spot position request, and the most suitable spot position arrangement, not only in a real location but also in a virtual space.

4. Third Example

Figure 24:
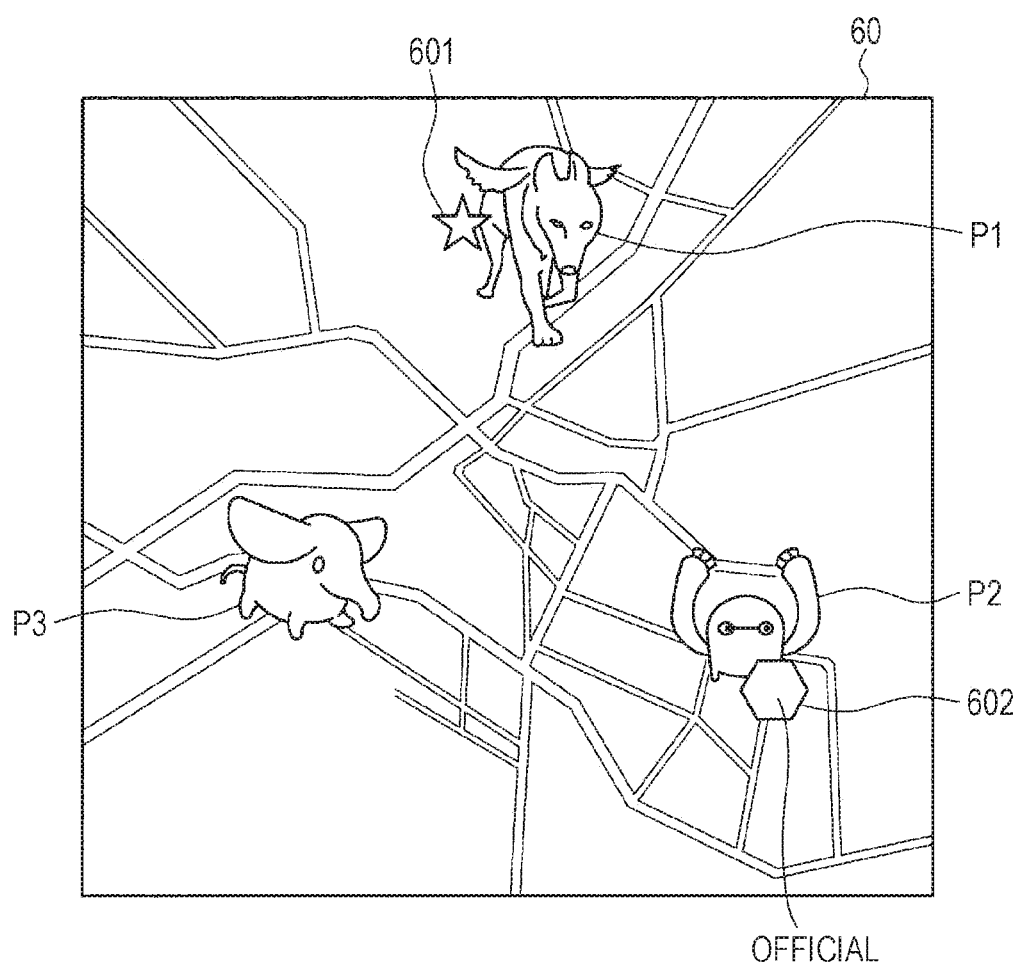
FIG. 24 is a drawing illustrating an example of a content arrangement screen according to the second example of the present embodiment.

Next, a case where the information processing system according to the present embodiment is applied to a mobile automatic selling device will be described with reference to FIGS. 26 to 24.

The information processing system according to the present example has a system configuration that includes the user terminal 1, a server 2C, and a mobile automatic selling device 4B. The user terminal 1, the server 2C, and the mobile automatic selling device 4B are connected to one another through the network 3, and therefore data can be transmitted/received thereamong. A configuration of the user terminal 1 is similar to that of the user terminal 1 according to the first example described with reference to FIG. 3, and therefore detailed description thereof will be omitted here.

<4-1. Configuration of Server 2C>

Figure 26:
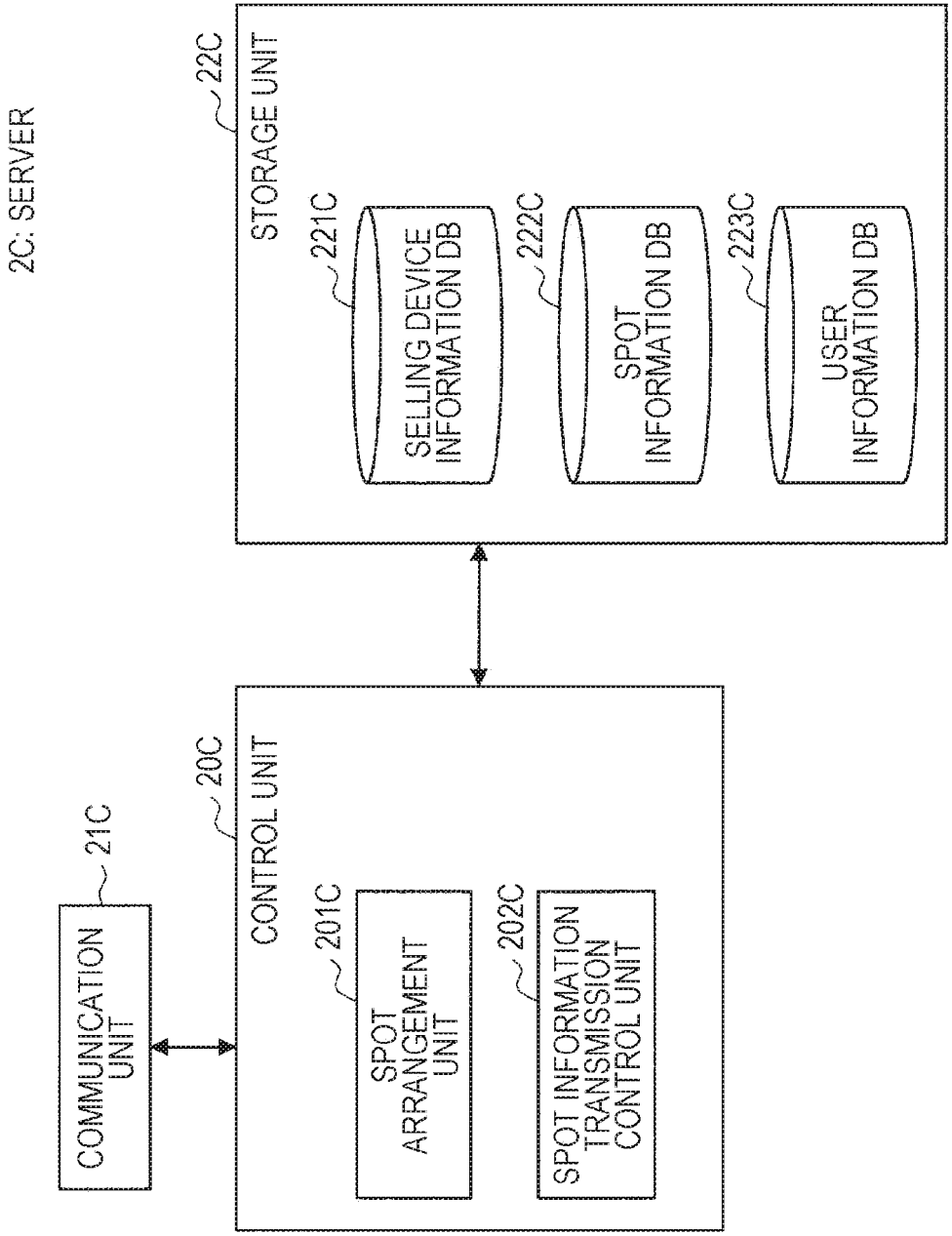
FIG. 26 is a block diagram illustrating an example of a configuration of a server according to a third example of the present embodiment.

FIG. 26 is a block diagram illustrating an example of a configuration of a server 2C according to the present example. As shown in FIG. 26, the server 2C includes a control unit 20C, a communication unit 21C, and a storage unit 22C.

(Control Unit 20C)

The control unit 20C functions as a computation processing device and a control device, and controls overall operation in the server 2C according to various kinds of programs. The control unit 20C is realized by, for example, an electronic circuit such as a Central Processing Unit (CPU), and a microprocessor. In addition, the control unit 20C may include a Read Only Memory (ROM) for storing a program, a computation parameter and the like that are used, and a Random Access Memory (RAM) for temporarily storing a parameter and the like that change as appropriate.

In addition, the control unit 20C according to the present embodiment also functions as a spot arrangement unit 201C and a spot information transmission control unit 202C.

The spot arrangement unit 201C optimizes arrangement of spot positions on the basis of spot position requests from one or more users. Spot position arrangement processing (that is to say, spot generation processing) will be specifically described in detail with reference to FIG. 34.

The spot information transmission control unit 202C performs the control in such a manner that information (spot information) related to the spot position determined by the spot arrangement unit 201C is transmitted to each of the user terminals 1 and the corresponding mobile automatic selling device 4B.

(Communication Unit 21C)

The communication unit 21C is wiredly or wirelessly connected to the network 3, and transmits/receives data to/from each of the user terminals 1 and the mobile automatic selling device 4B through the network 3. The communication unit 21C is communicably connected to the network 3 by using, for example, a wired/wireless Local Area Network (LAN), or Wi-Fi (Wireless Fidelity, registered trademark) or the like.

(Storage Unit 22C)

The storage unit 22C is realized by a ROM for storing a program, a computation parameter and the like that are used for processing of the control unit 20C, and by a RAM for temporarily storing a parameter and the like that change as appropriate.

For example, the storage unit 22C according to the present embodiment stores a selling device information DB 221C, a spot information DB 222C, and a user information DB 223C.

The selling device information DB 221C stores a present location, inventory information, the number of stop spots and the like of the mobile automatic selling device 4B. In addition, the spot information DB 222C stores information of a spot position (in the present example, a position at which the mobile automatic selling device 4B stops) determined by the spot arrangement unit 201C. Moreover, a requested spot position, the request time and the like are stored in the user information DB 223C by being associated with a user ID.

The configuration of the server 2C according to the present embodiment has been specifically described above. It should be noted that the configuration of the server 2C is not limited to the example shown in FIG. 26. For example, at least a part of the configuration of the server 2C may be located in an external device, or at least a part of each function of the control unit 20C may be realized by an information processing terminal (for example, a so-called edge server, etc.), the communication distance of which is relatively close to the user terminal 1. In this manner, distributing each configuration of the server 2C as appropriate enables to enhance real-time performance, to reduce a processing load, and further to ensure security.

<4-2. Configuration of Mobile Automatic Selling Device 4B>

Figure 27:
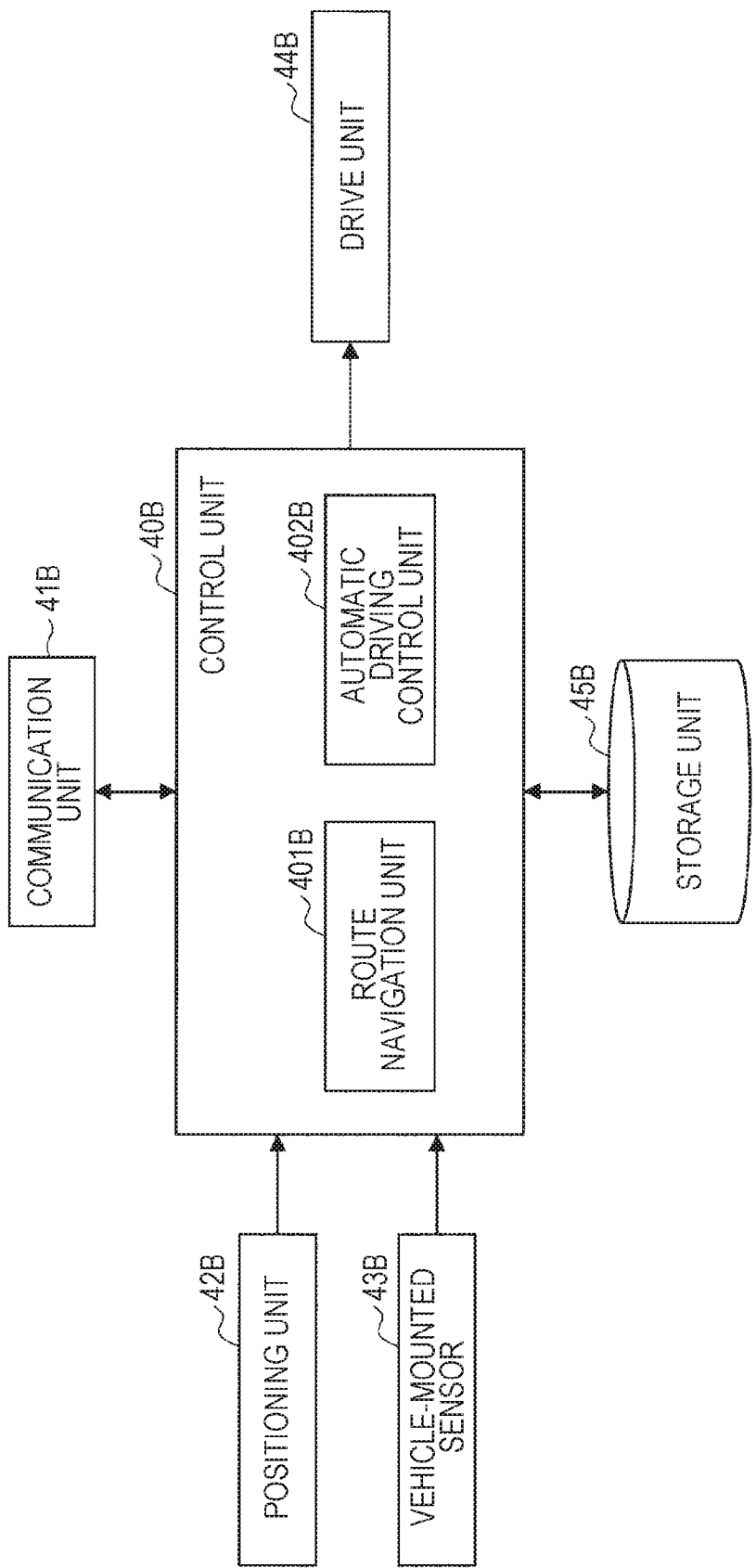
FIG. 27 is a block diagram illustrating an example of a configuration of a mobile automatic selling device according to the third example of the present embodiment.

FIG. 27 is a block diagram illustrating an example of a configuration of the mobile automatic selling device 4B according to the present example.

As shown in FIG. 27, the mobile automatic selling device 4B includes a control unit 40B, a communication unit 41B, a positioning unit 42B, a vehicle-mounted sensor 43B, a drive unit 44B, and a storage unit 45B.

The mobile automatic selling device 4B may be a moving object that is capable of moving by automatic driving, or may be a moving object that is capable of moving by manual operation by a driver. The mobile automatic selling device 4B loads a large number of commodities, and is capable of selling the commodities to users at each stop position.

(Control Unit 40B)

The control unit 40B functions as a computation processing device and a control device, and controls overall operation in the mobile automatic selling device 4B according to various kinds of programs. The control unit 40B is realized by, for example, an electronic circuit such as a Central Processing Unit (CPU), and a microprocessor. In addition, the control unit 40B may include a Read Only Memory (ROM) for storing a program, a computation parameter and the like that are used, and a Random Access Memory (RAM) for temporarily storing a parameter and the like that change as appropriate.

In addition, the control unit 40B according to the present embodiment also functions as a route navigation unit 401B and an automatic driving control unit 402B. The route navigation unit 401B navigates a route that goes around determined spot positions. For example, in a case where the present selling device is manually operated, the route navigation unit 401B guides a driver along a route for stop positions by sound or displaying. In addition, the automatic driving control unit 402B controls the drive unit 44B so as to automatically go around predetermined spot positions. In this case, the automatic driving control unit 402B may drive according to a notified route that has been calculated on the server 2C side.

(Communication Unit 41B)

The communication unit 41B is wiredly or wirelessly connected to the network 3, and transmits/receives data to/from the server 2C through the network 3. The communication unit 41B is communicably connected to the network 3 by using, for example, a wired/wireless Local Area Network (LAN), or Wi-Fi (Wireless Fidelity, registered trademark) or the like.

(Positioning Unit 42B)

The positioning unit 42B has a function of detecting a current position of the mobile automatic selling device 4B on the basis of a signal obtained from the outside. Specifically, for example, the positioning unit 42B is realized by a Global Positioning System (GPS) positioning unit. The positioning unit 42B receives an electrical wave from a GPS satellite to detect a position at which the mobile automatic selling device 4B exists, and outputs detected position information to the control unit 40B. In addition, other than GPS, the positioning unit 42B may be a unit that detects a position by using, for example, Wi-Fi (registered trademark), Bluetooth (registered trademark), by transmission and reception to/from a portable telephone, a PHS, a smart phone or the like, or by short-distance communication or the like.

(Vehicle-Mounted Sensor 43B)

The vehicle-mounted sensor 43B includes various sensors mounted in the mobile automatic selling device 4B, and outputs sensing data to the control unit 40B. For example, a camera, a human detection sensor, a speed sensor, an illuminance sensor, a measuring instrument, a microphone and the like are assumed as the vehicle-mounted sensor 43B. When automatic driving or automatic selling is performed, the vehicle-mounted sensor 43B is used as necessary.

(Drive Unit 44B)

The drive unit 44B is an autonomous mobile mechanism of the mobile automatic selling device 4B, and includes a motive power unit (an engine, a motor), a motive power transmission unit, a driving wheel, and the like.

(Storage Unit 45B)

The storage unit 45B is realized by a ROM for storing a program, a computation parameter and the like that are used for processing of the control unit 40B, and by a RAM for temporarily storing a parameter and the like that change as appropriate.

The configuration of the mobile automatic selling device 4B has been specifically described above. It should be noted that the configuration of the mobile automatic selling device 4B is not limited to the example shown in FIG. 27, and may further include, for example, an audio output unit (speaker), and a display unit.

<4-3. Operation Processing>

Subsequently, each operation processing according to the present example will be specifically described with reference to the drawings.

(4-2-1. Acceptance Processing of Accepting a Spot Position Request on the Server Side)

Figure 28:
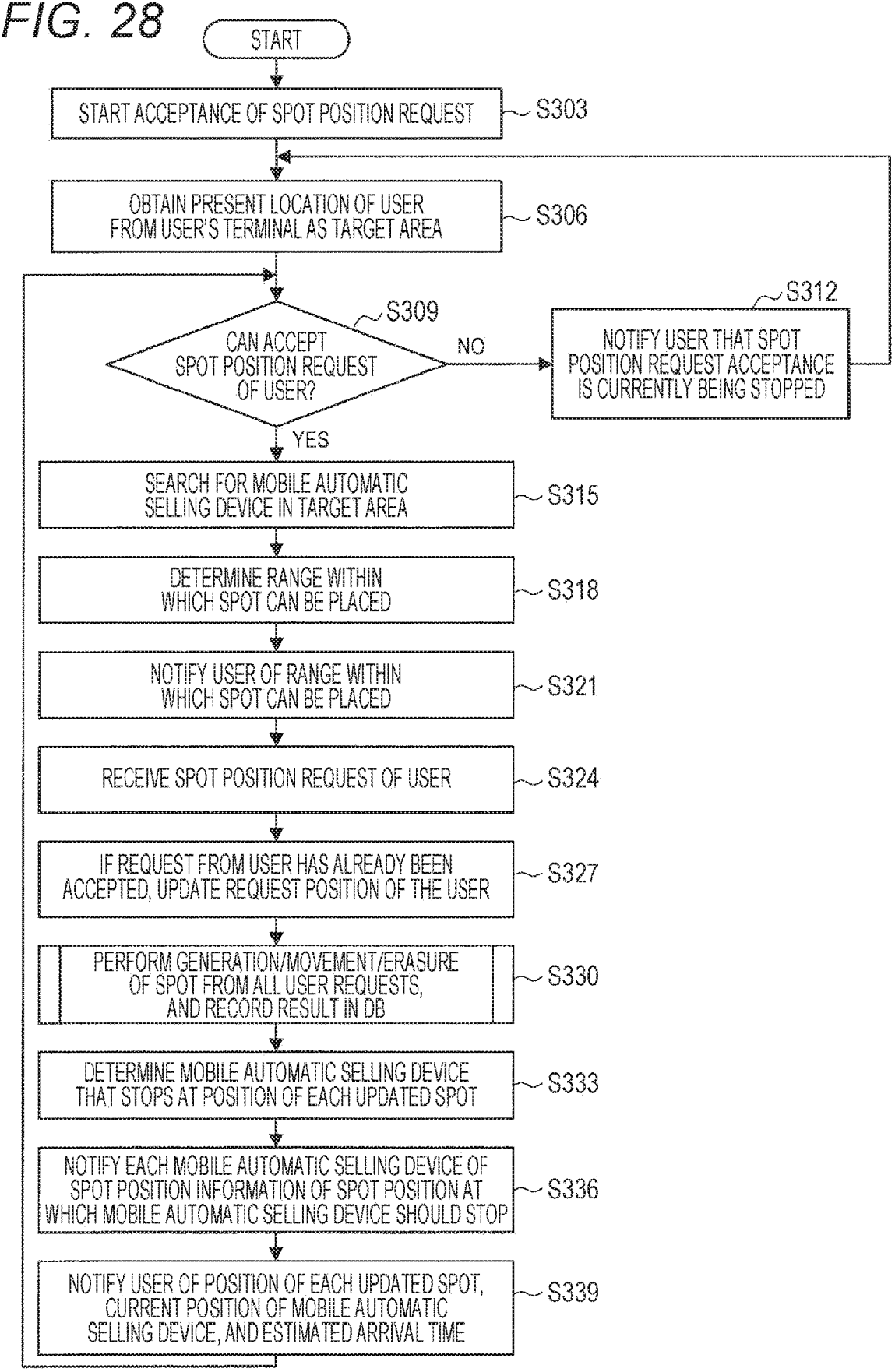
FIG. 28 is a flowchart illustrating acceptance processing of accepting a spot position request by the server according to the third example of the present embodiment.

First of all, acceptance processing of accepting a spot position request by the server 2C will be described with reference to FIG. 28. FIG. 28 is a flowchart illustrating acceptance processing of accepting a spot position request by the server 2C according to the present example.

As shown in FIG. 28, first of all, the server 2C starts acceptance of a spot position request (step S303). The start timing and end timing of accepting a spot position request may be, for example, during operating hours.

Next, the server 2C treats a present location of a user who has made a spot position request (here, a stop position request of the mobile automatic selling device 4B) as a target area (step S306). The target area may be designated by, for example, a radius Nm from the present location of the user, or may be set by latitude/longitude information.

Next, in a case where the server 2C is not in a state in which a spot position request of a user can be accepted (step S309/No), the server 2C notifies the user that acceptance of a position request is currently stopped (step S312). For example, it is assumed that if the number of stop spots becomes a fixed number or more, acceptance is temporarily stopped, and that if commodities are sold out, acceptance is stopped until the commodities are replenished.

Next, from the selling device information DB 221C, the server 2C searches for the mobile automatic selling device 4B that includes, as an operation range, the target area corresponding to the present location of the user (step S315).

Next, the server 2C determines a range within which a spot can be placed (step S318). The range within which a spot can be put may be, for example, a circular range that falls within a radius of nKm from the current position of the user, and that is along a road or in a parking area.

Next, the server 2C notifies the user of the position range within which a spot can be placed (step S321).

Next, the server 2C receives the spot position request of the user from the user terminal 1 (step S324).

Next, in the case of a request from the user who has already been accepted, the server 2C regards the request as a change of a request position (a temporal threshold value may be provided), and updates (overwrites) request information from the present user (step S327). The position request from each user is saved in the user information DB 223C. An example of position request information saved in the user information DB 223C is shown in FIG. 29. As shown in FIG. 29, position request time (latest) and a latest request position (latitude/longitude) are included in the position request information by being associated with a user ID.

Subsequently, the spot arrangement unit 201C of the server 2C generates, moves, or erases a spot on the basis of position requests of all users, and records a result thereof in the spot information DB 222C (step S330). Spot generation processing according to the present example will be described below in detail with reference to FIG. 34.

Next, the spot arrangement unit 201C determines the mobile automatic selling device 4B that stops at each updated spot (step S333). For example, the spot arrangement unit 201C may select a mobile automatic selling device that travels along a route closest to the spot from among routes of mobile automatic selling devices. Here, FIG. 30 illustrates an example of mobile automatic selling device information that is stored in the selling device information DB 221C.

As shown in FIG. 30, the mobile automatic selling device information includes an automatic selling device ID, a present location, an inventory status, and the number of stop spots. In addition, FIG. 31 illustrates an example of spot information stored in the spot information DB 222C. As shown in FIG. 31, a spot ID, a spot position (latitude/longitude), a user ID of a user who has made a position request (in a case where the number of users who have made position requests is two or more, a plurality of user IDs), an automatic selling device ID of an automatic selling device that stops the spot, the estimated arrival time of arrival at the spot are included in the spot information, and the like.

Next, the spot information transmission control unit 202C of the server 2C notifies the determined mobile automatic selling device 4B of updated spot position information (step S336).

In addition, the spot information transmission control unit 202C of the server 2C notifies the user of a position of the updated spot, a current position of the mobile automatic selling device 4B, and the estimated arrival time of arrival at the spot position based on the user request (step S339). Here, FIG. 32 illustrates an example of a spot information presentation screen displayed on the user terminal 1 side.

Figure 32:
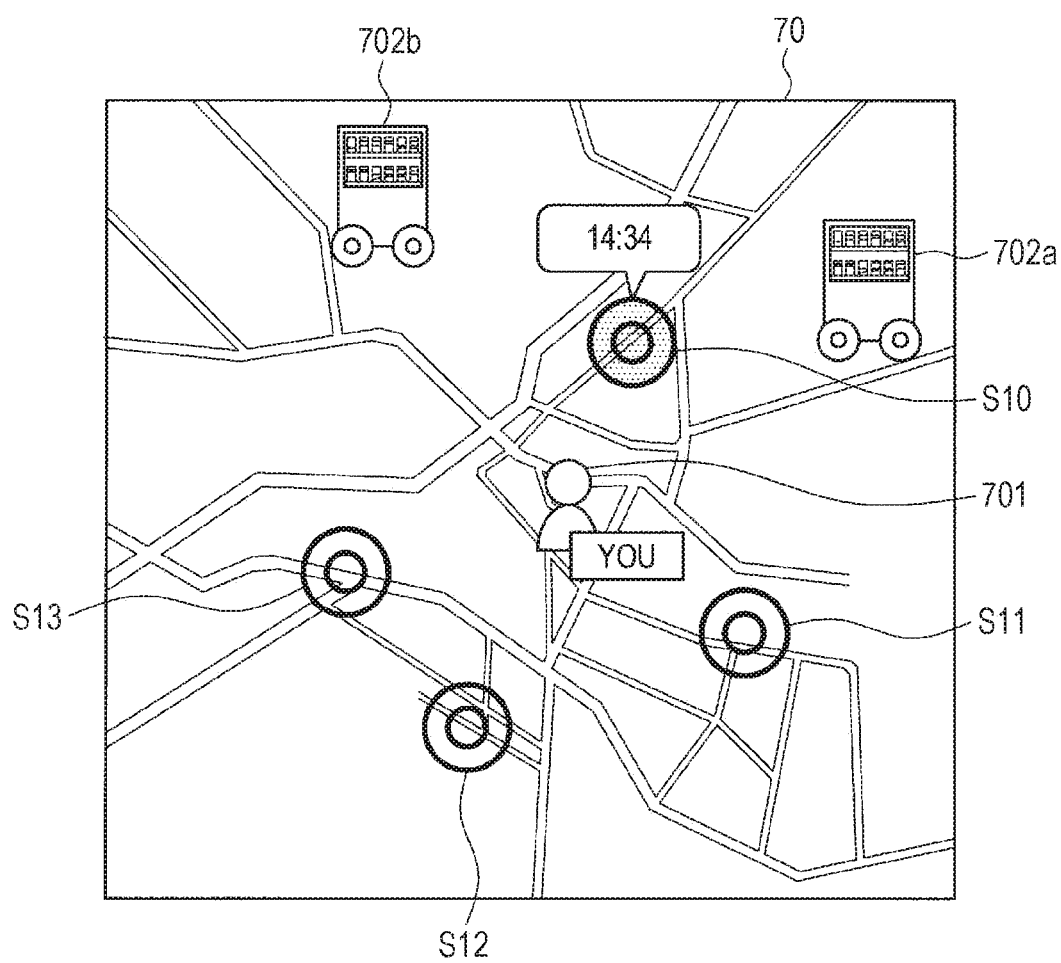
FIG. 32 is a drawing illustrating an example of a spot information presentation screen according to the third example of the present embodiment.

As shown in FIG. 32, on the spot information presentation screen 70, an icon 701 indicating a present location of the user, icons 702a, 702b indicating present locations of the respective mobile automatic selling devices 4B around the present location of the user, and spots S10 to S13 are clearly shown, for example, on a map image. The estimated arrival time of the mobile automatic selling device 4B is also displayed in the spot S10 that has been generated on the basis of the position request of the user. This enables the user to wait for arrival of the mobile automatic selling device 4B at the spot S10, and to purchase a commodity.

The acceptance processing according to the present example has been specifically described above.

(4-2-2. Processing on the Terminal Side)

Figure 33:
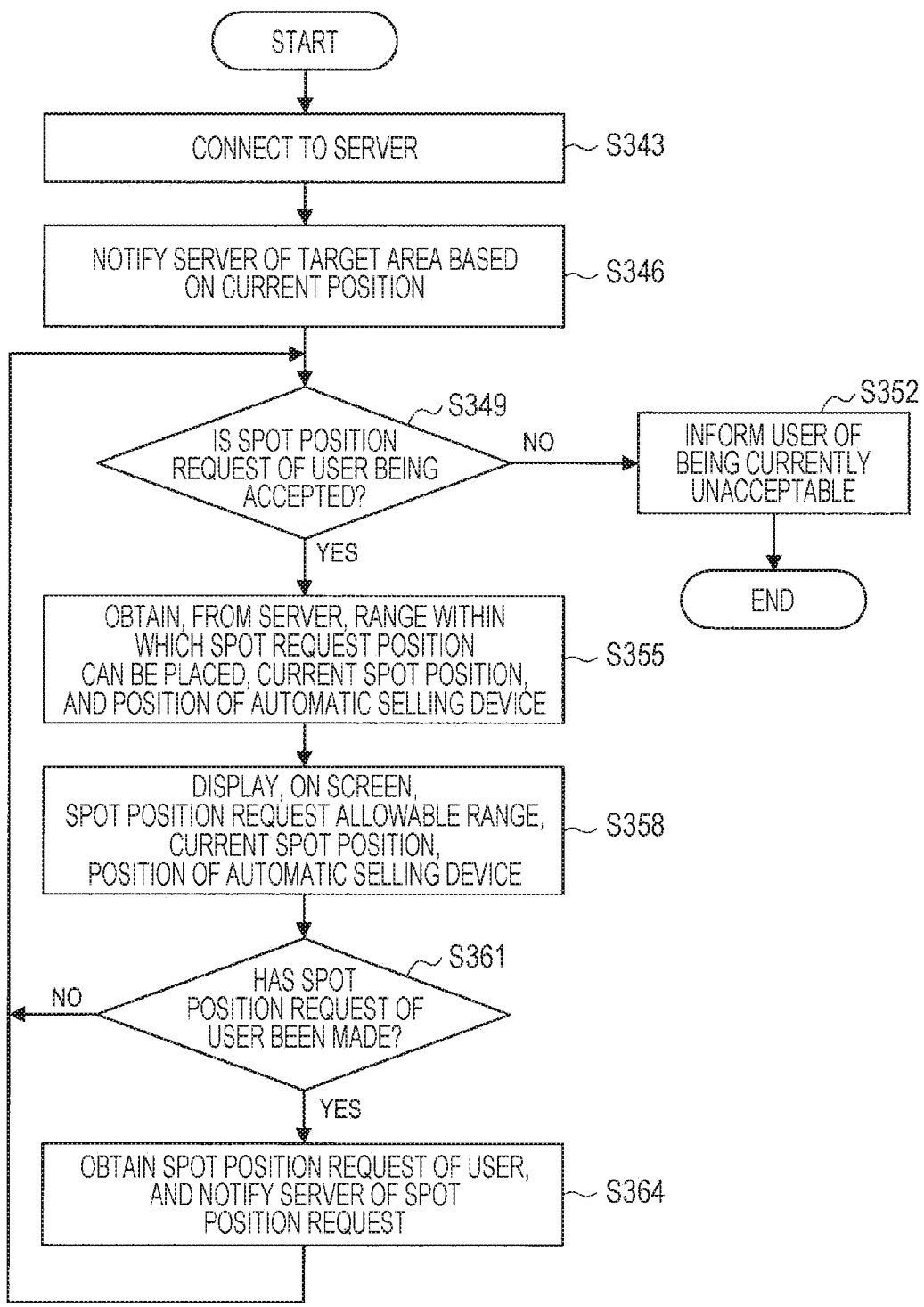
FIG. 33 is a flowchart illustrating operation processing of a position request by a user terminal 1 according to the third example of the present embodiment.

Subsequently, operation processing on the user terminal 1 side will be described with reference to FIG. 33. FIG. 33 is a flowchart illustrating operation processing of a position request by the user terminal 1 according to the present example.

As shown in FIG. 33, first of all, the user terminal 1 starts an application to connect to the server 2C (step S343).

Next, the user terminal 1 notifies the server 2C of a target area based on a present location (step S346).

Next, the user terminal 1 inquires whether or not a user's position request is being accepted (step S349), and in a case where acceptance is stopped, the user terminal 1 presents that effect to a user (step S352). For example, in a case where there is no currently effective service area in the target area requested by the user, or in a case where the target area is outside a service area, the user terminal 1 presents that effect to the user. In addition, even if the target area falls within a service area, in the case of a state in which the service is temporarily interrupted because of an excess of the number of stop spots, sold out, waiting for replenishment, or the like, the user terminal 1 displays that effect. In this case, the user may perform operation again after waiting for a fixed period of time.

Meanwhile, in a case where a user's position request is being accepted (step S349/Yes), the user terminal 1 obtains, from the server 2C, a range within which a spot position request can be placed in an area in which the user exists, a current spot position, and a current position of the mobile automatic selling device (step S355), and displays the obtained information on the screen (step S358).

Next, when the user performs spot position request operation (step S361/Yes), the user terminal 1 notifies the server 2C of the spot position request of the user (step S364).

Position request processing according to the present example has been specifically described above. It should be noted that since there is a possibility that a spot will be updated not only by the spot position request of the user, but also by spot position requests of other users, there is also a case where the position of the spot is updated during the processing of the steps S349 to S364 described above.

(4-2-3. Spot Generation Processing)

Next, spot generation processing according to the present example will be described with reference to FIG. 34. The spot generation processing according to the present example is mostly similar to that of the first example, and therefore will be simply described.

Figure 34:
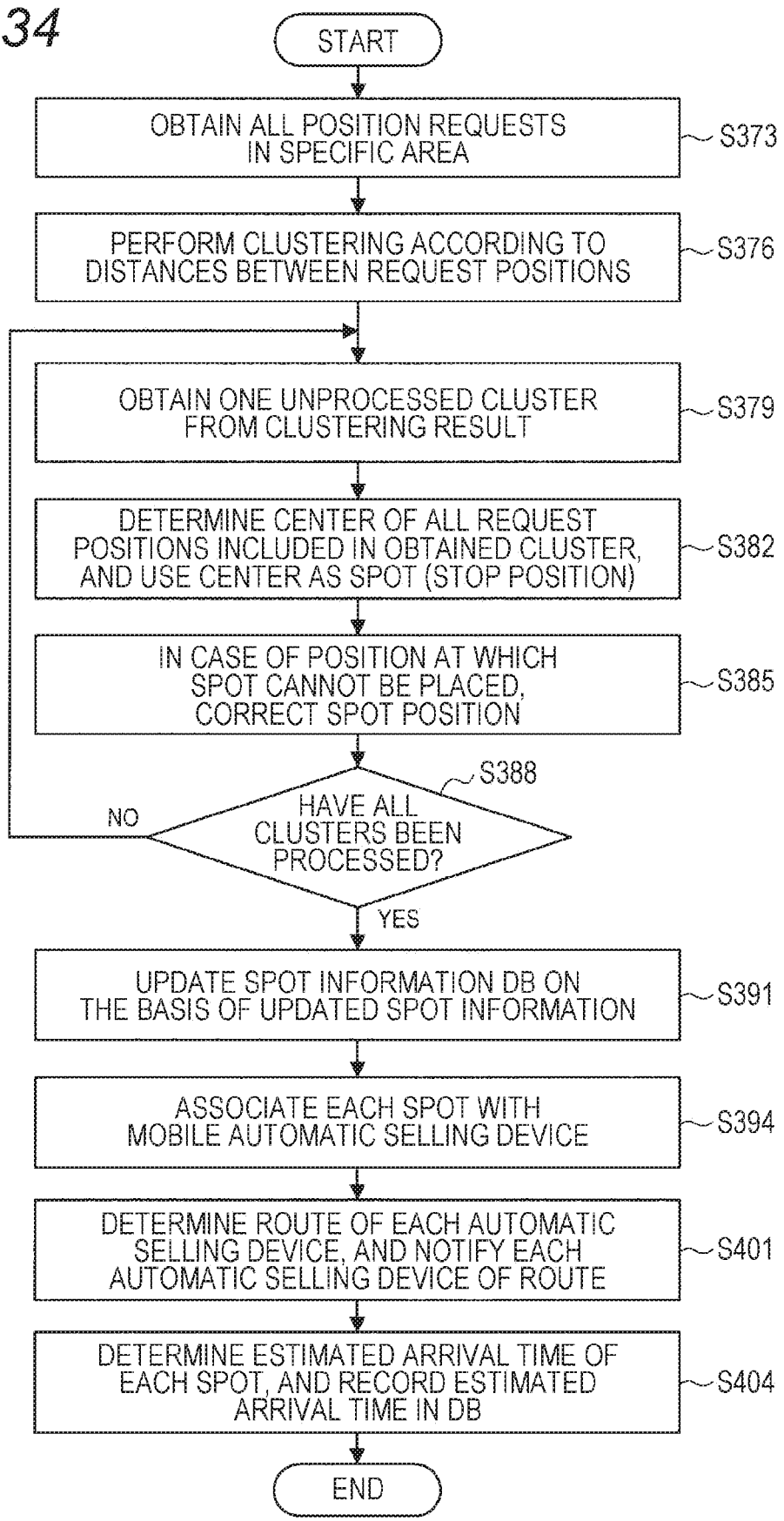
FIG. 34 is a flowchart illustrating spot generation processing according to the third example of the present embodiment.

FIG. 34 is a flowchart illustrating spot generation processing according to the present example. As shown in FIG. 34, first of all, the spot arrangement unit 201C of the server 2C obtains all position requests that have been accepted in a specific area (step S373).

It should be noted that the spot arrangement unit 201C may perform spot arrangement in a case where the number of acceptances exceeds the predetermined number. For example, requests from only several persons do not cause a stop position of an automatic selling device to be set. However, in a case where requests have been accepted from ten or more persons, a stop position may be set.

Next, the spot arrangement unit 201C performs clustering according to distances between request positions, and puts together position requests, which are close in distance, into a cluster (step S376). Details of clustering are similar to those of the first example, and therefore a detailed description thereof will be omitted.

Next, the spot arrangement unit 201C obtains one unprocessed cluster from a clustering result (step S379), determines the center of all request positions included in the obtained cluster, and uses the center as a spot (step S382). The calculation of the center is also similar to that of the first example, and therefore a detailed description thereof will be omitted.

Next, there is also a possibility that only simple determination of the center will result in a place in which a spot cannot be placed (a place having no road, etc.). Therefore, the spot arrangement unit 201C moves the spot to a spot placeable place that is closest to the latitude/longitude of the center (step S385).

Next, the spot arrangement unit 201C repeats the processing of the steps S379 to S385 until all clusters have been subjected to the processing (step S388).

Next, when all clusters have been subjected to the processing (step S388/Yes), the spot arrangement unit 201C gives an ID to each generated spot again, and registers (updates) the spot in the spot information DB 222C together with a user's ID that is associated with the cluster for which the spot has been generated (step S391).

Subsequently, the spot arrangement unit 201C associates each of the mobile automatic selling devices 4B with each spot (step S394). The number of mobile automatic selling devices 4B that take charge of a specific area may be two or more. The spot arrangement unit 201C associates an appropriate mobile automatic selling device 4B with each spot according to the present location, inventory status and the like of each mobile automatic selling device 4B. For example, the spot arrangement unit 201C associates a mobile automatic selling device that travels along a route closest to a certain spot with a spot ID.

Next, the server 2C causes the spot arrangement unit 201C to calculate a route of each mobile automatic selling device 4B on the basis of association of the mobile automatic selling device 4B with the generated spot, and causes the spot information transmission control unit 202C to notify each mobile automatic selling device of the route (step S401). In other words, the server 2C notifies each mobile automatic selling device 4B of a route along which the mobile automatic selling device 4B should travel, and a spot position at which the mobile automatic selling device 4B should stop. For example, existing algorithm used in a car navigation system may be used for the calculation of the route.

In addition, the server 2C calculates the estimated arrival time of the mobile automatic selling device 4B for arriving at each spot, and records the estimated arrival time in the spot information DB 222C (step S404).

The generation of spot positions according to the present example has been specifically described above.

5. Fourth Example

Subsequently, as a fourth example, a case where weighting is applied to a request position will be described.

The present example relates to a method for determining the center of the cluster described above with reference to FIG. 16. Weighting for bringing a spot position nearer is performed in such a manner that the spot position approaches a position indicated by a position request from, for example, a physically handicapped person such as an elderly person and a pregnant woman. Alternatively, by using past behavior histories of a user (various interaction histories such as a good deed, compliance with rules and manners, words of thanks, and taking good care of things), on the basis of a sensitivity value (an indicator for evaluating a new value such as reliability of the person) calculated from the past behavior histories, weighting is performed in such a manner that a spot appears nearby by priority for a person whose sensitivity value is high. In addition, a spot position is set by using the plurality of weightings in an integrated manner.

This enables to set a spot position in such a manner that a position request from a physically handicapped person such as an elderly person and a pregnant woman, a sensitivity value of a user, and a good-natured user are favorably treated.

In addition, in the case of scene hunting or a position game, a spot position can also be set by using weighting based on an achievement level of scene hunting, a (financial) contribution degree, a level in a game, presence/absence of a specific item, the game playing time or the like.

This enables to set a spot position in such a manner that a position request from a person who frequently uses scene hunting or a position game, or from a person whose contribution degree is high, is favorably treated.

The present example will be specifically described below with reference to FIGS. 35 to 37. In the present example, as an example, a spot position S based on a cluster is calculated in consideration of physical weighting and sensitivity value-based weighting.

FIG. 35 is a drawing illustrating an example of user information stored in the user information DB 223. As shown in FIG. 35, for example, in a case where physical weighting $W_p$ and sensitivity value-based weighting $W_k$ are registered on a user basis, the spot position S is calculated by integrating these weightings. Integrated weighting $\Lambda$ may be, for example, the sum total of $W_p$ and $W_k$, or may be multiplication of $W_p$ and $W_k$ if a more extreme difference is required. For example, in the case of multiplication, $\Lambda = W_p \times W_k$.

In addition, taking position requests of all users in the same cluster, and weighting, into consideration, the server 2 calculates the spot position S by using the undermentioned equation. In the undermentioned equation, $\Lambda$ that is associated with a user ID is represented as $\Lambda_{id}$, and the latitude/longitude of a position request of the user is represented as $P_{id}$.

$$S = \frac{\Sigma P_{id} \cdot \Lambda_{id}}{\Sigma \Lambda_{id}} \quad \text{[Equation 1]}$$

It should be noted that at the time of calculation, the latitude and longitude are separately calculated, each of the latitude and longitude of all position requests is multiplied by a request position and weighting for each user ID, values of all users are added up, and the total value thereof is divided by the total of weighting of all users. As the result, the latitude and longitude of the spot position S becomes a position in which the weighting is taken into consideration. Here, FIG. 36 illustrates a specific example of calculating the spot position S.

Figure 36:
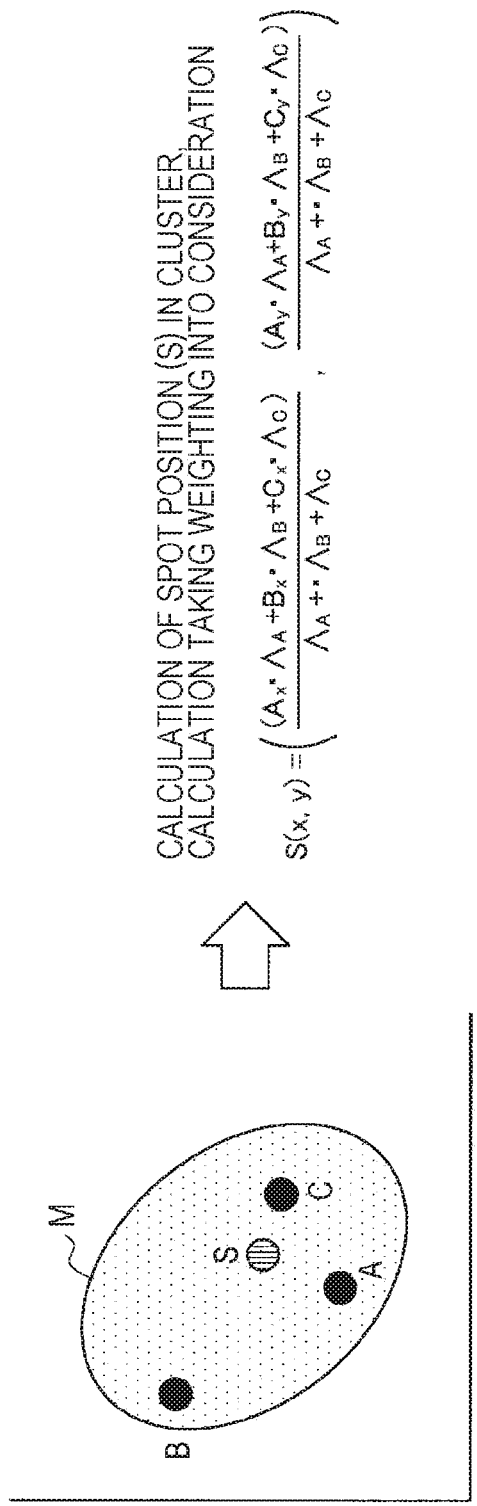
FIG. 36 is a drawing illustrating a specific example of spot position calculation in consideration of weighting according to the fourth example of the present embodiment.

The example in FIG. 36 shows calculation of the spot position S in which weighting in a cluster M that includes three points, that is to say, request positions A, B, C from respective users, is taken into consideration. As shown in FIG. 36, in consideration of weighting of each of users A, B, C who have requested the request positions A, B, C respectively, the latitude/longitude in which weighting is taken into consideration is calculated by using the equation 1.

It should be noted that the method for determining a spot position in consideration of weighting is not limited to the above-described example. A spring mechanical model such as that performed in, for example, drawing of a social graph may be applied. As another specific example of spot position calculation in consideration of weighting, FIG. 37 illustrates an example of spot position calculation that uses a mechanical model.

Figure 37:
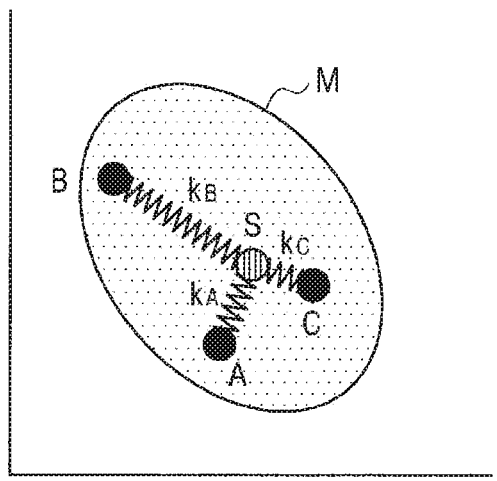
FIG. 37 is a drawing illustrating another specific example of spot position calculation in consideration of weighting according to the fourth example of the present embodiment.

As shown in FIG. 37, for example, a point at which weighting balances as a spring coefficient with the request points A to C fixed may be used as the spot position S. In a social graph, A, B and C nodes also move by mechanics. However, in the case of the present example, it is a spring problem at a fixed end without moving A, B, and C nodes that are user's request positions.

As described above, according to the present example, when a spot position is generated on the basis of position requests from a plurality of users, further suitable spot position arrangement can be performed in consideration of favorable treatment of an elderly person, a pregnant woman and the like, or the like.

6. Summary

As described above, in the information processing system according to the embodiment of the present disclosure, a spot position of service provision can be set so as to further improve convenience for users.

The preferable embodiments of the present disclosure have been described in detail as above with reference to the accompanying drawings. However, the present technology is not limited to the above-described examples. It is clear that those who have ordinary skills in the technical field of the present disclosure can conceive of various correction examples or modification examples within the category of the technical idea set forth in the claims. It should be understood that, as a matter of course, these examples also belong to the technical scope of the present disclosure.

For example, it is also possible to create a computer program that causes hardware such as a CPU, a ROM and a RAM to realize functions of the user terminals 1, the servers 2 (2A, 2B, 2C) or the moving objects 4 (the bus devices 4A, the mobile automatic selling devices 4B), the hardware being built into the user terminals 1, the servers 2 (2A, 2B, 2C) or the moving objects 4 (the bus device 4A, the mobile automatic selling device 4B). In addition, a computer-readable storage medium that stores the computer program is also provided.

Furthermore, the effects described in the present description are to be construed as merely descriptive or illustrative, and are not limitative. In other words, the technology according to the present disclosure can achieve, along with or instead of the above effects, other effects apparent to a person skilled in the art from the statement of the present description.

It should be noted that the present technology can also employ the following configurations.

(1)

An information processing device including:

a communication unit that receives a position request from a user, the position request requesting a position of a spot at which a specific service is provided; and a control unit that dynamically sets a position of the spot by analyzing position requests from a plurality of users received through the communication unit.

(2)

The information processing device set forth in the preceding (1), in which the control unit performs control in such a manner that a spot is newly generated at a position obtained by analyzing a plurality of positions indicated by position requests from the plurality of users.

(3)

The information processing device set forth in the preceding (1), in which when the control unit receives, through the communication unit, a request to cancel at least a part of the position requests from the plurality of users, the control unit performs control in such a manner that the newly generated spot is erased.

(4)

The information processing device set forth in the preceding (1), in which when a spot that provides the same specific service already exists around a plurality of positions indicated by position requests from the plurality of users, the control unit performs control in such a manner that a spot is newly generated at a position obtained by analyzing a position of the spot that already exists and the plurality of positions indicated by the position requests from the plurality of users, and that the spot that already exists is erased.

(5)

The information processing device set forth in any one of the preceding (1) to (4), in which by analyzing a plurality of positions indicated by position requests from the plurality of users who request a position of a spot at which a specific moving means stops, the position requests being received through the communication unit, the control unit dynamically sets the position of the spot.

(6)

The information processing device set forth in the preceding (5), in which by analyzing a plurality of positions indicated by position requests from the plurality of users who requests a position and date and time of a spot at which a specific moving means stops, the position requests being received through the communication unit, the control unit dynamically sets the position of the spot in a predetermined time unit.

(7)

The information processing device set forth in the preceding (5) or (6), in which the control unit displays an image indicating a stop at a position of the set spot on a map image, and generates a presentation screen that clearly indicates scheduled time at which the specific moving means arrives at the stop, and a route of the specific moving means.

(8)

The information processing device set forth in any one of the preceding (1) to (4), in which by analyzing a plurality of positions indicated by position requests from the plurality of users who request a position of a spot at which specific content is provided, the position requests being received through the communication unit, the control unit dynamically sets the position of the spot, and registers the position of the spot with the set spot associated with the specific content.

(9)

The information processing device set forth in the preceding (8), in which the positions indicated by the position requests include a position of a real space or a position of a virtual space.

(10)

The information processing device set forth in the preceding (8) or (9), in which the control unit displays an image of the associated specific content at a position of the set spot on the map image, and generates a presentation screen that clearly indicates whether the spot is an official spot set beforehand on the management side, an unofficial spot set on the basis of a request from a general user, or a spot set on the basis of a request from a user.

(11)

The information processing device set forth in any one of the preceding (1) to (7), in which by analyzing a plurality of positions indicated by position requests from the plurality of users who requests a position of a spot at which an automatic driving service moving object is provided, the position requests being received through the communication unit, the control unit dynamically sets the position of the spot.

(12)

The information processing device set forth in any one of the preceding (1) to (11), in which by weighting a plurality of positions indicated by position requests from the plurality of users according to properties of each user to perform analyzation, the position requests being received through the communication unit, the control unit dynamically sets a position of the spot.

(13)

An information processing method executed by a processor, the method including the steps of:

receiving a position request from a user by a communication unit, the position request requesting a position of a spot at which a specific service is provided; and dynamically setting a position of the spot by analyzing position requests from a plurality of users received through the communication unit.

REFERENCE SIGNS LIST

1 User terminal
10 Control unit
101 Request processing unit
102 Information presentation unit
11 Communication unit
12 Operation input unit
13 Positioning unit
14 Display unit
15 Storage unit
2 Server
2A Server
20A Control unit
201A Spot arrangement unit
202A Spot information transmission control unit
21A Communication unit
22A Storage unit
221A Bus information DB
222A Spot information DB
223A User information DB
2B Server
20B Control unit
201B Spot arrangement unit
202B Spot information transmission control unit
203B Game progress control unit
21B Communication unit
22B Storage unit
221B Content information DB
222B Spot information DB
223B User information DB
2C Server
20C Control unit
202C Spot arrangement unit
202C Spot information transmission control unit
21C Communication unit
22C Storage unit
221C Selling device information DB
222C Spot information DB
223C User information DB
3 Network
4 Moving object
4A Bus device 40A Control unit
41A Communication unit
42A Positioning unit
43A Display unit
44B Storage unit
4B Mobile automatic selling device
40B Control unit
401B Route navigation unit
402B Automatic driving control unit
41B Communication unit
42B Positioning unit
43B Vehicle-mounted sensor
45B Storage unit
44B Drive unit

The invention claimed is:

1. An information processing device, comprising:
 a communication unit configured to receive a plurality of position requests from a plurality of user terminals, wherein
  each position request of the plurality of position requests is associated with a respective user terminal of the plurality of user terminals, and
  each position request of the plurality of position requests corresponds to a position of a first spot for a specific service; and
 a control unit configured to:
  dynamically set a position of a second spot for the specific service, wherein the position of the second spot is dynamically set based on the plurality of position requests; and
  notify the position of the second spot to a specific user terminal of the plurality of user terminals.

2. The information processing device according to claim 1, wherein
 each position request of the plurality of position requests includes information of a respective request position of a plurality of request positions for the specific service, and
 the control unit is further configured to:
  determine the position of the second spot based on the of the plurality of request positions; and
  generate the second spot at the determined position of the second spot.

3. The information processing device according to claim 1, wherein the control unit is further configured to:
 receive, via the communication unit, a cancel request, wherein the cancel request is associated with cancellation of at least one position request of the plurality of position requests; and
 erase the second spot based on the cancel request.

4. The information processing device according to claim 1, wherein
 each position request of the plurality of position requests includes information of a respective request position of a plurality of request positions for the specific service,
 the specific service is associated with a specific moving means,
 the position of the first spot is a spot position at which the specific moving means stops,
 the control unit is further configured to dynamically set the position of the second spot based on the plurality of request positions.

5. The information processing device according to claim 4, wherein
 each position request of the plurality of position requests includes information associated with a position, date, and time of the first spot, and
 the control unit is further configure to dynamically set the position of the second spot in a specific time unit based on the plurality of request positions.

6. The information processing device according to claim 4, wherein the control unit is further configured to control a display unit to display:
 an image indicating a stop at the position of the second spot position on a map image; and
 a presentation screen that clearly indicates:
  a scheduled time associated with arrival of the specific moving means at the stop, and
  a route of the specific moving means.

7. The information processing device according to claim 1, wherein
 each position request of the plurality of position requests includes information of a respective request position of a plurality of request positions for the specific service,
 each position request of the plurality of position requests is associated with specific content of the specific service,
 the control unit is further configured to:
  dynamically set the position of the second spot based on the plurality of request positions; and
  register the position of the second spot with with the specific content in a specific database.

8. The information processing device according to claim 7, wherein each request position of the plurality of request positions include one of a position of a real space or a position of a virtual space.

9. The information processing device according to claim 7, wherein the control unit is further configured to:
 control a display unit to display:
  an image of the specific content at the position of the second spot on the on a map image, and
  a presentation screen indicating that the second spot is one of:
   an official spot, or
   an unofficial spot set based on a a position request of the plurality of position requests.

10. The information processing device according to claim 1, wherein
 each position request the plurality of position requests includes information of a respective request position of a plurality of request positions for the specific service,
 the specific service is associated with an automatic driving service moving object, and
 the control unit is further configured to dynamically set the position of the second spot based on the plurality of request positions.

11. The information processing device according to claim 1, wherein
 each position request the plurality of position requests includes information of a respective request position of a plurality of request positions for the specific service,
 the control unit is further configured to:
  execute a weighting process for each request position of the plurality of request positions based on user properties associated with a respective position request of the plurality of position requests; and
  dynamically set the position of the second spot based on the execution of the weighting process for each request position of the plurality of request positions.

12. An information processing method, comprising:
 receiving a plurality of position requests from a plurality of user terminals, wherein each position request of the plurality of position requests is associated with a respective user terminal of the plurality of user terminals, and each position request of the plurality of position requests corresponds to a position of a first spot for a specific service; and dynamically setting a position of a second spot for the specific service, wherein the position of the second spot is dynamically set based on the plurality of position requests; and notifying the position of the second spot to a specific user terminal of the plurality of user terminals.

\* \* \* \* \*